US010895994B2

(12) United States Patent
Abe et al.

(10) Patent No.: US 10,895,994 B2
(45) Date of Patent: Jan. 19, 2021

(54) FILE ACCESS CONTROL ON MAGNETIC TAPE BY ENCRYPTING METADATA

(71) Applicant: International Business Machines Corporation, Armonk, NY (US)

(72) Inventors: Atsushi Abe, Ebina (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/838,151

(22) Filed: Dec. 11, 2017

(65) Prior Publication Data
US 2019/0180778 A1 Jun. 13, 2019

(51) Int. Cl.
*G06F 3/06* (2006.01)

(52) U.S. Cl.
CPC .......... *G06F 3/0622* (2013.01); *G06F 3/062* (2013.01); *G06F 3/0623* (2013.01); *G06F 3/0637* (2013.01); *G06F 3/0682* (2013.01); *G06F 3/0686* (2013.01); *G06F 2211/108* (2013.01); *G06F 2212/213* (2013.01)

(58) Field of Classification Search
CPC ...... G06F 21/62; G06F 3/0682; G06F 3/0686; G06F 2211/108; G06F 2212/213; G06F 3/062; G06F 3/0622; G06F 3/0623
See application file for complete search history.

(56) References Cited

U.S. PATENT DOCUMENTS

| | | | | |
|---|---|---|---|---|
| 4,316,261 A * | 2/1982 | Kimura | ............ | G06K 15/1295 710/20 |
| 6,490,648 B1 * | 12/2002 | Kaneda | ................ | G06F 3/0611 711/111 |
| 6,529,996 B1 * | 3/2003 | Nguyen | ................ | G06F 3/0626 711/114 |
| 6,609,046 B2 * | 8/2003 | Ostwald | ............... | G11B 15/689 700/214 |
| 8,656,186 B2 * | 2/2014 | Greco | ............. | G11B 20/00086 713/193 |
| 9,037,790 B2 | 5/2015 | Jaquette et al. | | |

(Continued)

FOREIGN PATENT DOCUMENTS

WO   WO 2018/020451   *  2/2018   ............. G06F 12/14

OTHER PUBLICATIONS

Encrypt Data at Rest with Amazon EFS Encrypted File Systems; Amazon (Year: 2017).*

(Continued)

*Primary Examiner* — Paul M Knight
(74) *Attorney, Agent, or Firm* — Zilka-Kotab, P.C.

(57) ABSTRACT

A tape drive-implemented method for encrypting metadata on a magnetic tape, the tape drive-implemented method, according to one embodiment, includes: writing an index to a magnetic tape. The index includes: metadata corresponding to a file stored on the magnetic tape, and metadata corresponding to a directory structure of the file. The tape drive-implemented method additionally includes: using a first key to encrypt a first portion of the metadata in the index corresponding to the file, and using a second key to encrypt a first portion of the metadata in the index corresponding to the directory structure of the file. Other systems, methods, and computer program products are described in additional embodiments.

16 Claims, 16 Drawing Sheets

(56) References Cited

U.S. PATENT DOCUMENTS

| | | | |
|---|---|---|---|
| 9,430,155 B2 | 8/2016 | Amir et al. | |
| 9,465,947 B2* | 10/2016 | Nakhjiri | H04L 63/06 |
| 2002/0004883 A1* | 1/2002 | Nguyen | G06F 3/0613 |
| | | | 711/111 |
| 2007/0081670 A1* | 4/2007 | Topham | H04L 9/0637 |
| | | | 380/239 |
| 2007/0101158 A1* | 5/2007 | Elliott | G06F 21/79 |
| | | | 713/193 |
| 2008/0095375 A1* | 4/2008 | Tateoka | H04L 9/085 |
| | | | 380/282 |
| 2011/0307724 A1* | 12/2011 | Shaw | G06F 21/305 |
| | | | 713/323 |
| 2012/0229931 A1* | 9/2012 | Katagiri | G11B 20/10527 |
| | | | 360/73.04 |
| 2014/0201424 A1* | 7/2014 | Chen | G06F 3/0674 |
| | | | 711/103 |
| 2016/0012256 A1* | 1/2016 | Topham | G06F 21/73 |
| | | | 713/193 |
| 2016/0078244 A1* | 3/2016 | Bruso | G06F 21/6218 |
| | | | 713/189 |
| 2016/0147479 A1* | 5/2016 | Iwanaga | G06F 16/134 |
| | | | 707/741 |
| 2016/0188624 A1 | 6/2016 | Ashida et al. | |
| 2016/0291891 A1* | 10/2016 | Cheriton | G06F 21/6218 |
| 2017/0063805 A1* | 3/2017 | Mishra | G06F 8/654 |
| 2019/0171841 A1* | 6/2019 | Steinfeld | G06F 21/6218 |

OTHER PUBLICATIONS

File-Based Media Workflows using LTFS Tapes by Amir (Year: 2010).*
How do I encrypt a file or folder in my home directory?; UC Berkley (Year: 2016).*
Keeping Data for a Long Time by Coughlin (Year: 2014).*
What's So Great About XML? by Holzner (Year: 2003).*
MiniCrypt: Reconciling Encryption and Compression for Big Data Stores by Zheng (Year: 2017).*
ErsatzPasswords: Ending Password Cracking and Detecting Password Leakage by Almeshekah (Year: 2015).*
Amir et al., "File-Based Media Workflows Using LTFS Tapes," MM '10, Proceedings of the 18th ACM international conference on Multimedia, Oct. 25-29, 2010, pp. 1519-1520.

* cited by examiner

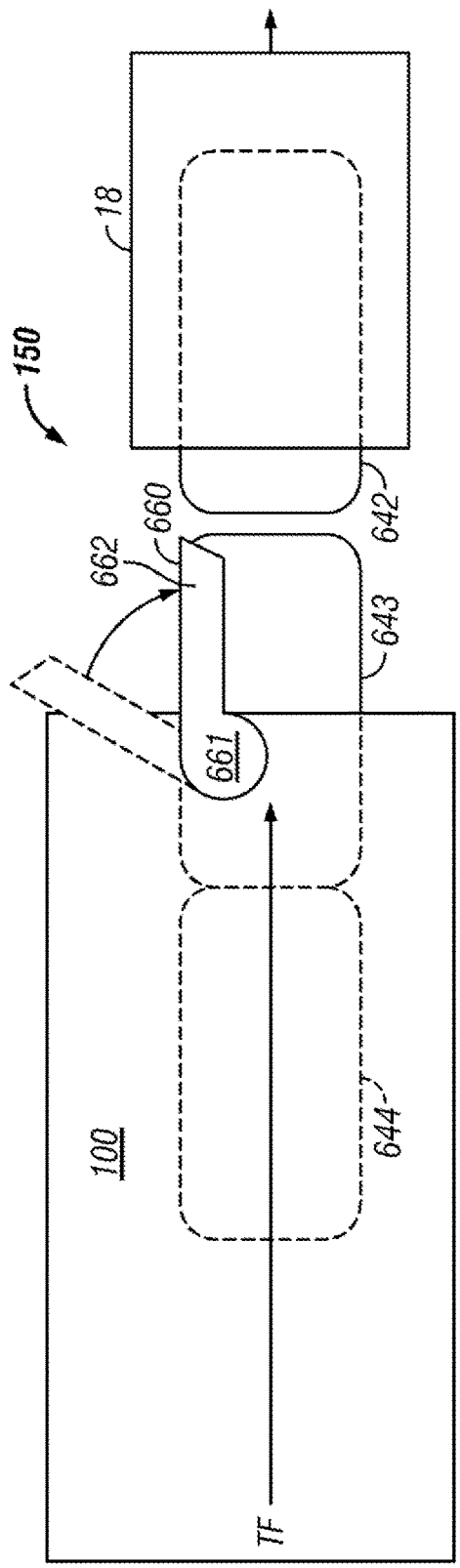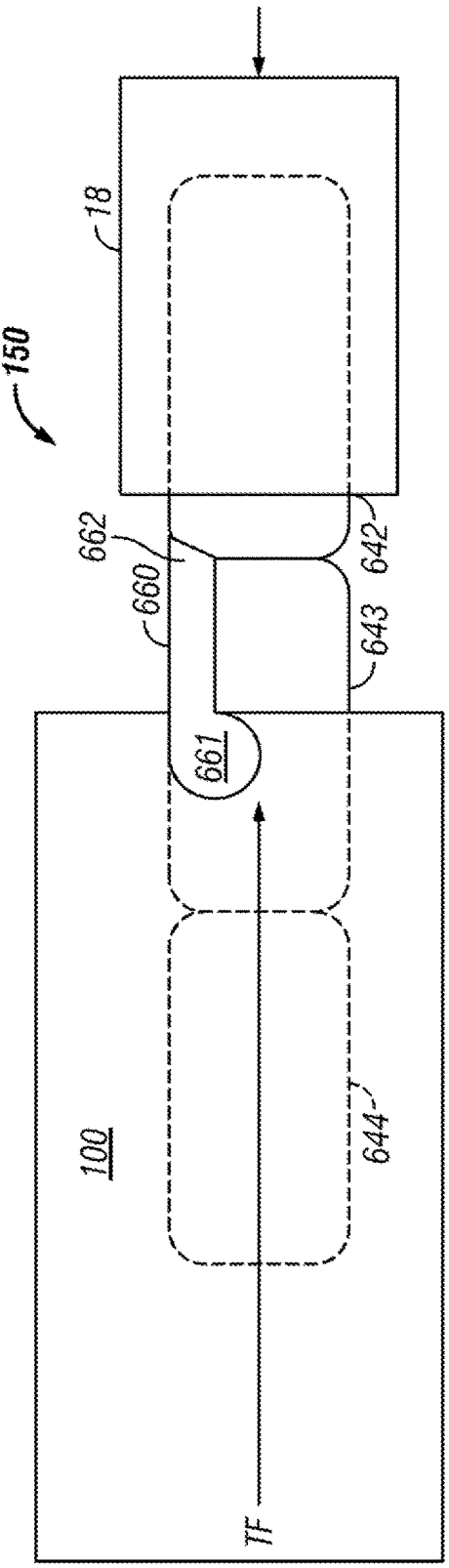
FIG. 8C
FIG. 8D

1100

```
<file>
    <name>file1</name>
    <length>17686403</length>
    <readonly>false</readonly>
    <creationtime>2017-05-15T09:36:22.976568000Z</creationtime>
    <changetime>2017-05-15T09:38:03.668319000Z</changetime>
    <modifytime>2017-05-15T09:38:03.668319000Z</modifytime>
    <accesstime>2017-05-15T09:36:22.976568000Z</accesstime>
    <backuptime>2017-05-15T09:36:22.976568000Z</backuptime>
    <fileuid>4</fileuid>
    <extentinfo>
        <extent>
        <fileoffset>0</fileoffset>
        <partition>b</partition>
        <startblock>115</startblock>
        <byteoffset>0</byteoffset>
        <bytecount>17686403</bytecount>
        </extent>
    </extentinfo>
</file>
```

FIG. 11

```
 6 <updatetime>2017-85-15109:39:86.7852030002</updatetime>
 7 <location>
 8 <partition>a</partition>
 9 <startblock>S<startblock>
10 </location>
11 <previousgenerationlocation>
12 <partition>D</partition>
13 <startblock>926</startblock>
14 </previousgenerationlocation>
15 <allowpolicyupdate>true</allowpolicyupdate>
16 <highestfileuid>5</highestfileuid>
17 <directory>
18    <name/>
19    <readonly>false</readonly>
20    <creationtime>2017-05-15T09:33:27.333685000Z</creationtime>
21    <changetime>2017-05-15T09:36:00.101991000Z</changetime>
22    <modifytime>2017-05-15T09:36:00.101991000Z</modifytime>
23    <accesstime>2017-05-15T09:38:58.729239000Z</accesstime>
24    <backuptime>2017-05-15T09:33:27.333685000Z</backuptime>
25    <fileuid>1</fileuid>
26    <contents>
27       <directory>
28          <name>dir1</name>
29          <readonly>false</readonly>
30          <creationtime>2017-05-15T09:36:22.976568000Z</creationtime>
31          <changetime>2017-05-15T09:36:22.976568000Z</changetime>
32          <modifytime>2017-05-15T09:36:22.976568000Z</modifytime>
33          <accesstime>2017-05-15T09:36:22.976568000Z</accesstime>
34          <backuptime>2017-05-15T09:36:22.976568000Z</backuptime>
35          <fileuid>2</fileuid>
36          <contents>
37             <file>
38                <name>file1</name>
39                <length>17686403</length>
40                <readonly>false</readonly>
41                <creationtime>2017-05-15T09:36:22.976568000Z</creationtime>
42                <changetime>2017-05-15T09:36:22.976568000Z</changetime>
43                <modifytime>2017-05-15T09:36:22.976568000Z</modifytime>
44                <accesstime>2017-05-15T09:36:22.976568000Z</accesstime>
45                <backuptime>2017-05-15T09:36:22.976568000Z</backuptime>
46                <fileuid>4</fileuid>
47                <extentinfo>
48                   <extent>
49                      <fileoffset>0</fileoffset>
50                      <partition>b</partition>
51                      <startblock>115</startblock>
52                      <byteoffset>0</byteoffset>
53                      <bytecount>17686403</bytecount>
54                   </extent>
55                </extentinfo>
56             </file>
57          </contents>
58       </directory>
59       <directory>
60          <name>dir2</name>
61          <readonly>false</readonly>
62          <creationtime>2017-05-15T09:36:22.976568000Z</creationtime>
63          <changetime>2017-05-15T09:36:22.976568000Z</changetime>
64          <modifytime>2017-05-15T09:36:22.976568000Z</modifytime>
65          <accesstime>2017-05-15T09:36:22.976568000Z</accesstime>
66          <backuptime>2017-05-15T09:36:22.976568000Z</backuptime>
67          <fileuid>3</fileuid>
68          <contents>
69             <file>
70                <name>file2</name>
71                <length>486609770</length>
72                <readonly>false</readonly>
73                <creationtime>2017-05-15T09:36:22.976568000Z</creationtime>
74                <changetime>2017-05-15T09:36:22.976568000Z</changetime>
75                <modifytime>2017-05-15T09:36:22.976568000Z</modifytime>
76                <accesstime>2017-05-15T09:36:22.976568000Z</accesstime>
77                <backuptime>2017-05-15T09:36:22.976568000Z</backuptime>
78                <fileuid>5</fileuid>
79                <extentinfo>
80                   <extent>
81                      <fileoffset>0</fileoffset>
82                      <partition>b</partition>
83                      <startblock>149</startblock>
84                      <byteoffset>8</byteoffset>
85                      <bytecount>486609770</bytecount>
86                   </extent>
87                </extentinfo>
88             </file>
```

1400

Key1 (lines 28–57)

Key2 (lines 62–87)

FIG. 14A

```
 6 <updatetime>2017-85-15109:39:86.7852030002</updatetime>
 7 <location>
 8 <partition>a</partition>                                        1450
 9 <startblock>S<startblock>
10 </location>
11 <previousgenerationlocation>
12 <partition>D</partition>
13 <startblock>926</startblock>
14 </previousgenerationlocation>
15 <allowpolicyupdate>true</allowpolicyupdate>
16 <highestfileuid>5</highestfileuid>
17 <directory>
18 []   <name/>
19      <readonly>false</readonly>
20      <creationtime>2017-05-15T09:33:27.333685000Z</creationtime>
21      <changetime>2017-05-15T09:36:00.101991000Z</changetime>
22      <modifytime>2017-05-15T09:36:00.101991000Z</modifytime>
23      <accesstime>2017-05-15T09:38:58.729239000Z</accesstime>
24      <backuptime>2017-05-15T09:33:27.333685000Z</backuptime>
25      <fileuid>1</fileuid>
26      <contents>
27      <directory>
28      <encryotedmeta>
29  dkeuifjfjfuirndsloiusydfopuiasyfopiqeritouweoirugkjsnvkljsdnflvkndfkvjnsdlkfjnvskldfjgueropi
    asdfsadfasdfopiusydfopuiasyfopigeritouweoirugkjsnvkljsdnflvkndfkvjnsdlkfjnvskldfjgueropi908
    jdge73yrmgfu4946rjfiog89834jfdifjg9d8sg09lkjhlfdgoihssdoifjgopsdifgpo8t459dfsjggopisdjfgoid
    asdvnvdhjdmghfhrur7494fjguf7494nfytr84i4uruinrfeiu3rfun49jv49fj9348jf935jf9348jr9ejrgougd
    dkljanslfkdjnawlefniegurgiuerifuhsadiufysadjfhbsajdfbasdkfh87wefuasbdfasdfhaskldfhaskldfhil
    asdvnvdhjdmghfhrur7494fjguf7494nfytr84i4uruinrfeiu3rfun49jv49fj9348jf935jf9348jr9ejrgougd
    dkljanslfkdjnawlefniegurgiuerifuhsadiufysadjfhbsajdfbasdkfh87wefuasbdfasdfhaskldfhaskldfhil
    aslkdjfbweyriwuery3729r8239rhsdiuhfioasudhfow8yriuw39898jhklasjhdflsaishdfkljsadklklhfkals
    sgdfasdfrtngjtnrtbrtpiertiuywefbvjkdhfvl876asdfgdasdbiuysdfghrtyityuertdfgxbhsfhnnnsdfgsrter
30      </encryotedmeta>
31      </directory>
32      <directory>
33         <name>dir2</name>
34         <readonly>false</readonly>
35         <creationtime>2017-05-15T09:36:00.101991000ZZ</creationtime>
36         <changetime>2017-05-15T09:39:00.745098000Z</changetime>
37         <modifytime>2017-05-15T09:39:00.745098000Z</modifytime>
38         <accesstime>2017-05-15T09:39:00.745098000Z</accesstime>
39         <backuptime>2017-05-15T09:39:00.745098000Z</backuptime>
40         <fileuid>3</fileuid>
41         <contents>
42         <file>
43         <encryotedmeta>
44  dkek4kfoe4984msydfopuiasyfopiqeritouweoirugkjsnvkljsdnflvkndfkvjnsdlkfjnvskldfjgueropi
    asdfsadfasdfopiusydfopuiasyfopigeritouweoirugkjsnvkljsdnflvkndfkvjnsdlkfjnvskldfjgueropi908
    jdge73yrmgfu4946rjfiog89834jfdifjg9d8sg09lkjhlfdgoihssdoifjgopsdifgpo8t459dfsjggopisdjfgoid
    asdvnvdhjdmghfhrur7494fjguf7494nfytr84i4uruinrfeiu3rfun49jv49fj9348jf935jf9348jr9ejrgougd
    dkljanslfkdjnawlefniegurgiuerifuhsadiufysadjfhbsajdfbasdkfh87wefuasbdfasdfhaskldfhaskldfhil
    asdvnvdhjdmghfhrur7494fjguf7494nfytr84i4uruinrfeiu3rfun49jv49fj9348jf935jf9348jr9ejrgougd
    dkljanslfkdjnawlefniegurgiuerifuhsadiufysadjfhbsajdfbasdkfh87wefuasbdfasdfhaskldfhaskldfhil
    aslkdjfbweyriwuery3729r8239rhsdiuhfioasudhfow8yriuw39898jhklasjhdflsaishdfkljsadklklhfkals
    sgdfasdfrtngjtnrtbrtpiertiuywefbvjkdhfvl876asdfgdasdbiuysdfghrtyityuertdfgxbhsfhnnnsdfgsrter
45         </encryotedmeta>
46         8/file>
47         </contents>
48         </directory>
49      </contents>
50  </directory>
```

FIG. 14B

FILE ACCESS CONTROL ON MAGNETIC TAPE BY ENCRYPTING METADATA

BACKGROUND

The present invention relates to data storage systems, and more particularly, this invention relates to encrypting metadata on magnetic tapes.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

Magnetic tapes are a desirable data storage medium in view of their relatively large capacity and portability. However, ease of portability also exposes magnetic tapes to theft. In case of theft or loss of a magnetic tape having data stored thereon, conventional products include ways of protecting the data on the tapes, namely by encrypting the data. Encryption broadly includes the process of encoding information in such a way that only authorized parties can access it. Encryption does not itself prevent interference, but denies the intelligible information from being accessed by unauthorized entities.

Encryption for magnetic tape in conventional products is implemented in such a manner that either all data stored on the magnetic tape is encrypted, or none of the data stored on the magnetic tape is encrypted at all. Each magnetic tape that includes encrypted data is thereby assigned a different cryptographic key, and users authorized to access the data on a tape are given the cryptographic key corresponding thereto. However, with the increase in capacity of magnetic tape media in recent years, it has become common to share one tape with multiple entities or to lend out an archived tape. However, this results in multiple users being given access to all data stored on a same tape, thereby decreasing data security for magnetic tape.

SUMMARY

A tape drive-implemented method for encrypting metadata on a magnetic tape, the tape drive-implemented method, according to one embodiment, includes: writing an index to a magnetic tape. The index includes: metadata corresponding to a file stored on the magnetic tape, and metadata corresponding to a directory structure of the file. The tape drive-implemented method additionally includes: using a first key to encrypt a first portion of the metadata in the index corresponding to the file, and using a second key to encrypt a first portion of the metadata in the index corresponding to the directory structure of the file.

A computer program product for encrypting metadata on a magnetic tape, the computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: writing, by the processor, an index to a magnetic tape. The index includes: metadata corresponding to a plurality of files stored on the magnetic tape, and metadata corresponding to a directory structure of the plurality of files. Furthermore, the program instructions are readable and/or executable by the processor to cause the processor to perform the method which includes: using, by the processor, a first key to encrypt a first portion of the metadata in the index corresponding to the plurality of files; and using, by the processor, a second key to encrypt a first portion of the metadata in the index corresponding to the directory structure of the plurality of files.

A computer-implemented method, according to yet another embodiment, includes: receiving an access request for data stored on a magnetic tape. The magnetic tape includes an index having metadata corresponding to files stored on the magnetic tape and metadata corresponding to a directory structure of the files. At least some of the metadata corresponding to the files stored on the magnetic tape is encrypted with a first key. Moreover, at least some of the metadata corresponding to the directory structure of the files is encrypted with a second key. The computer-implemented method also includes: receiving a key corresponding to a particular entity; using the received key to decrypt a portion of the encrypted metadata in the index of the magnetic tape; and outputting a resulting file. The resulting file is based on the portion of the metadata in the index of the magnetic tape decrypted by the received key.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

FIG. 11 is a representational view of computer code for forming an exemplary file tag according to one embodiment.

FIG. 14A-14B are partial representational view of computer code according to one embodiment.

DETAILED DESCRIPTION

Figure 1:
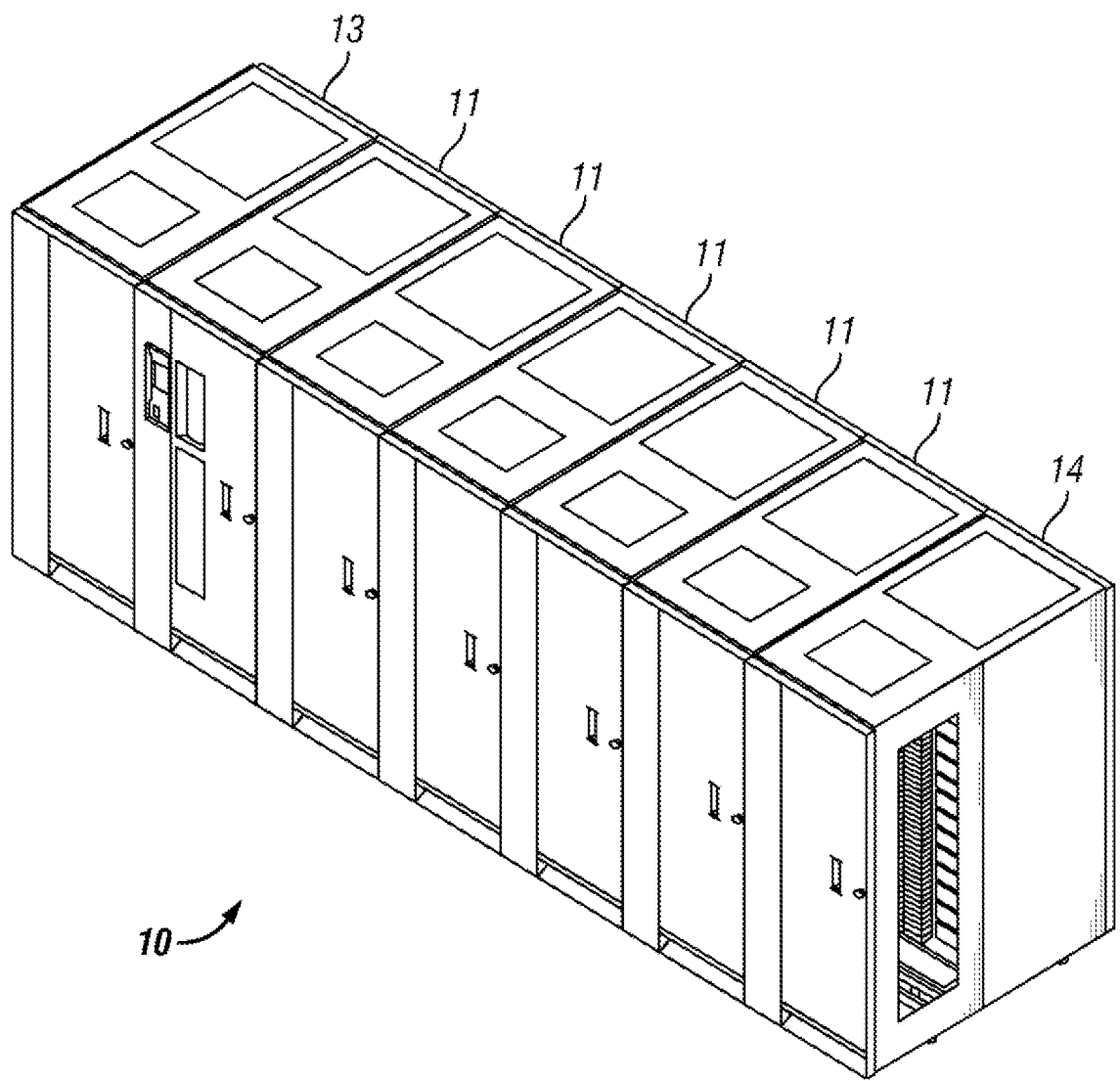
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof, which include encrypting metadata associated with the directory corresponding to a file, and/or metadata associated with the file itself. By encrypting the metadata as described herein, different entities (e.g., users) may be given keys that decrypt the metadata associated with certain directories and/or files depending on the amount of access the different entities are permitted. As a result, some of the embodiments described herein are able to achieve added granularity in terms of the security afforded for a given magnetic tape, and allows for multiple users to access different portions of the information stored in a single magnetic tape without compromising the security of the data, e.g., as will be described in further detail below.

In one general embodiment, a tape drive-implemented method for encrypting metadata on a magnetic tape, the tape drive-implemented method including: writing an index to a magnetic tape. The index includes: metadata corresponding to a file stored on the magnetic tape, and metadata corresponding to a directory structure of the file. The tape drive-implemented method additionally includes: using a first key to encrypt a first portion of the metadata in the index corresponding to the file, and using a second key to encrypt a first portion of the metadata in the index corresponding to the directory structure of the file.

In another general embodiment, a computer program product for encrypting metadata on a magnetic tape, the computer program product including a computer readable storage medium having program instructions embodied therewith. The computer readable storage medium is not a transitory signal per se. Moreover, the program instructions are readable and/or executable by a processor to cause the processor to perform a method which includes: writing, by the processor, an index to a magnetic tape. The index includes: metadata corresponding to a plurality of files stored on the magnetic tape, and metadata corresponding to a directory structure of the plurality of files. Furthermore, the program instructions are readable and/or executable by the processor to cause the processor to perform the method which includes: using, by the processor, a first key to encrypt a first portion of the metadata in the index corresponding to the plurality of files; and using, by the processor, a second key to encrypt a first portion of the metadata in the index corresponding to the directory structure of the plurality of files.

In another general embodiment, a computer-implemented method includes: receiving an access request for data stored on a magnetic tape. The magnetic tape includes an index having metadata corresponding to files stored on the magnetic tape and metadata corresponding to a directory structure of the files. At least some of the metadata corresponding to the files stored on the magnetic tape is encrypted with a first key. Moreover, at least some of the metadata corresponding to the directory structure of the files is encrypted with a second key. The computer-implemented method also includes: receiving a key corresponding to a particular entity; using the received key to decrypt a portion of the encrypted metadata in the index of the magnetic tape; and outputting a resulting file. The resulting file is based on the portion of the metadata in the index of the magnetic tape decrypted by the received key.

Figure 2:
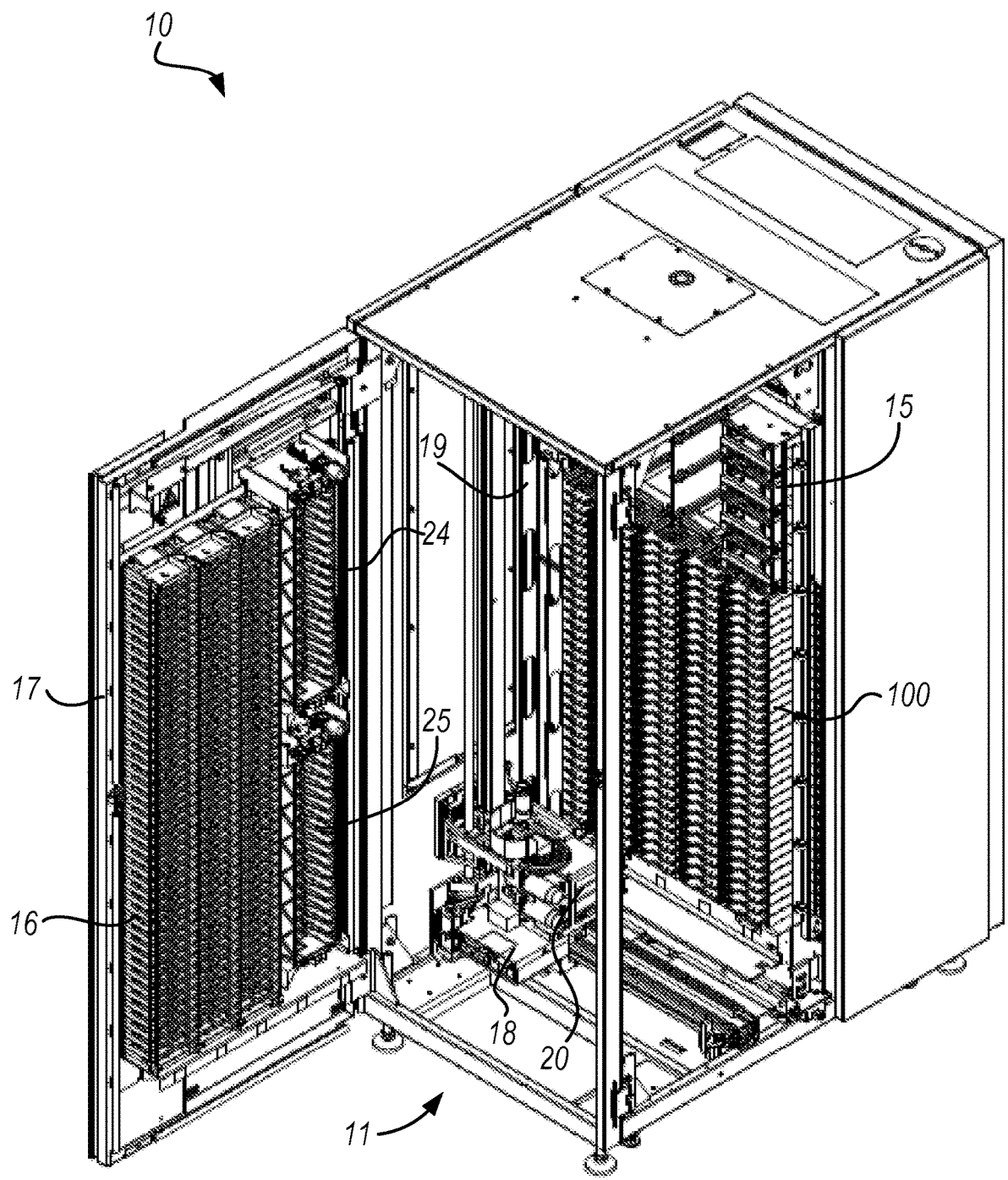
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
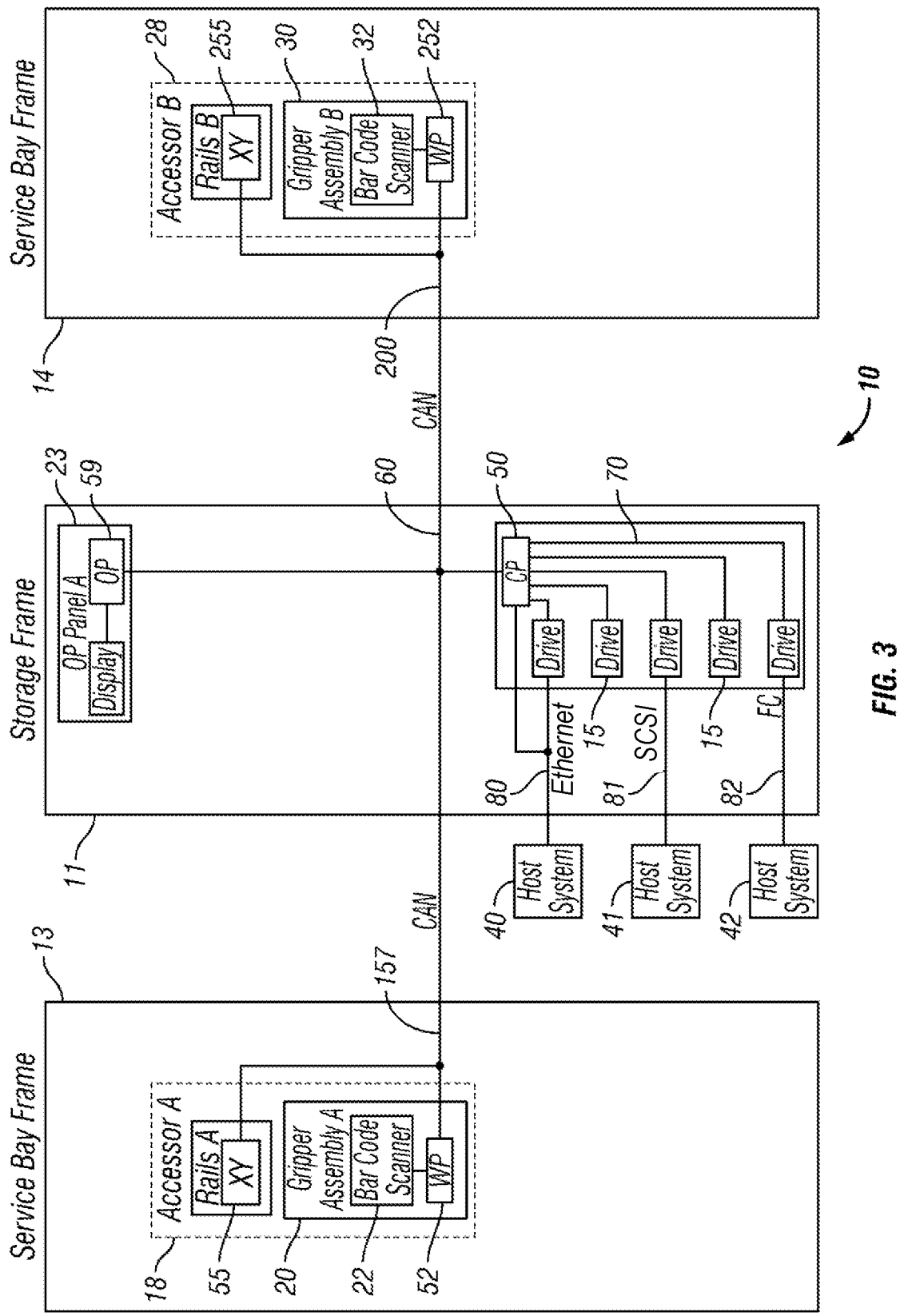
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on connection 80, through one or more control ports (not shown), or through one or more data storage drives 15 on connections 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to connection 80.

Still referring to FIG. 3, the communication processor node 50 may additionally provide a communication link via lines 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input connection 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, connection 82 may be a bus which includes an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
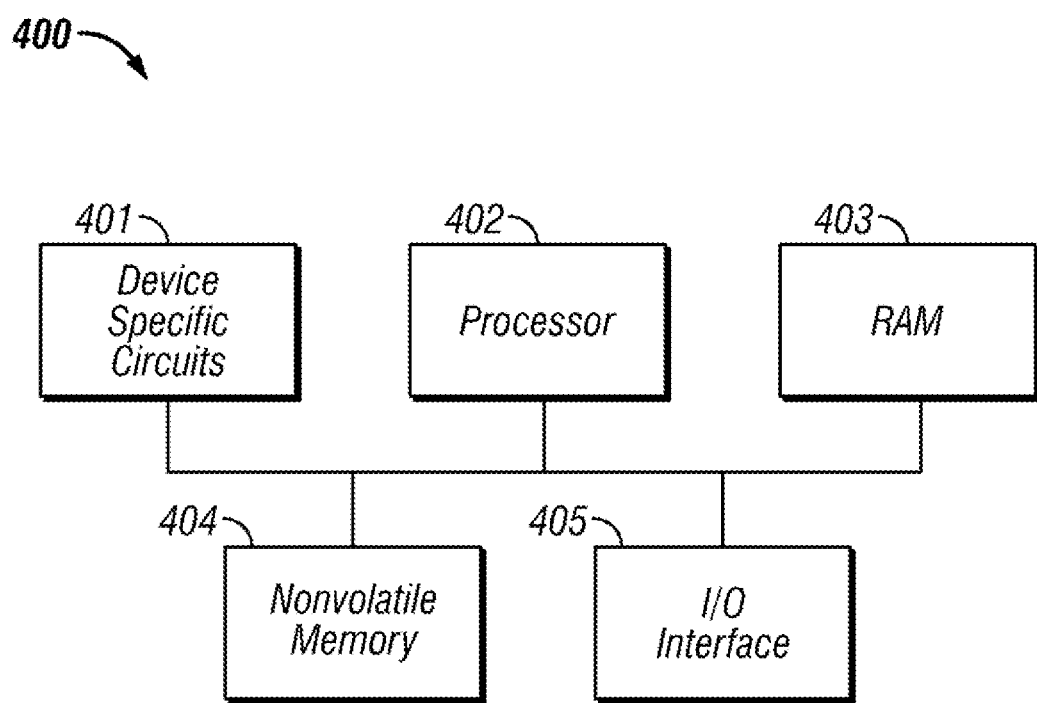
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
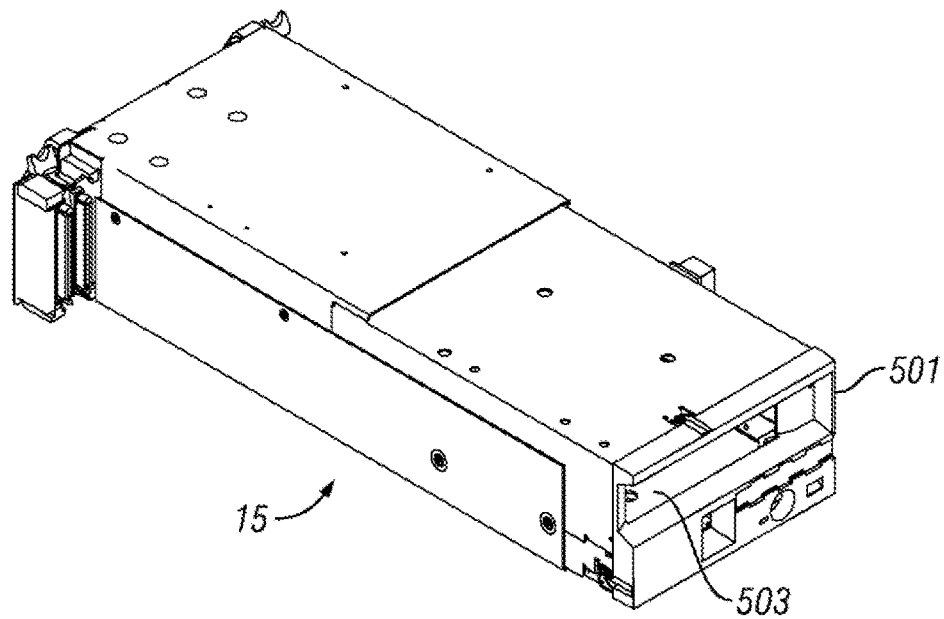
FIG. 5A is a front perspective view of a data storage drive according to one embodiment.
Figure 5B:
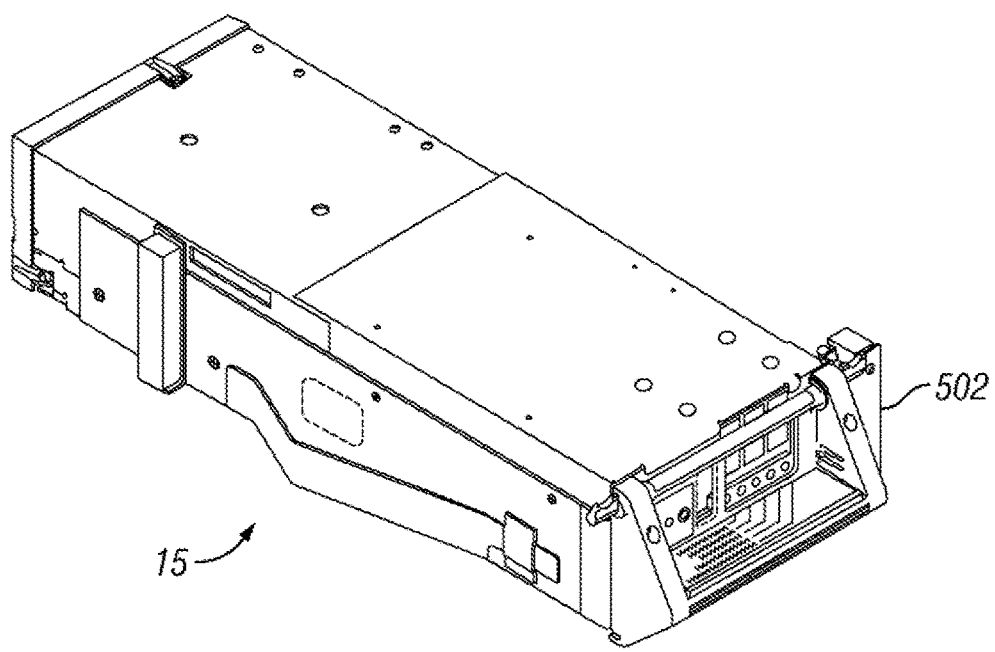
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
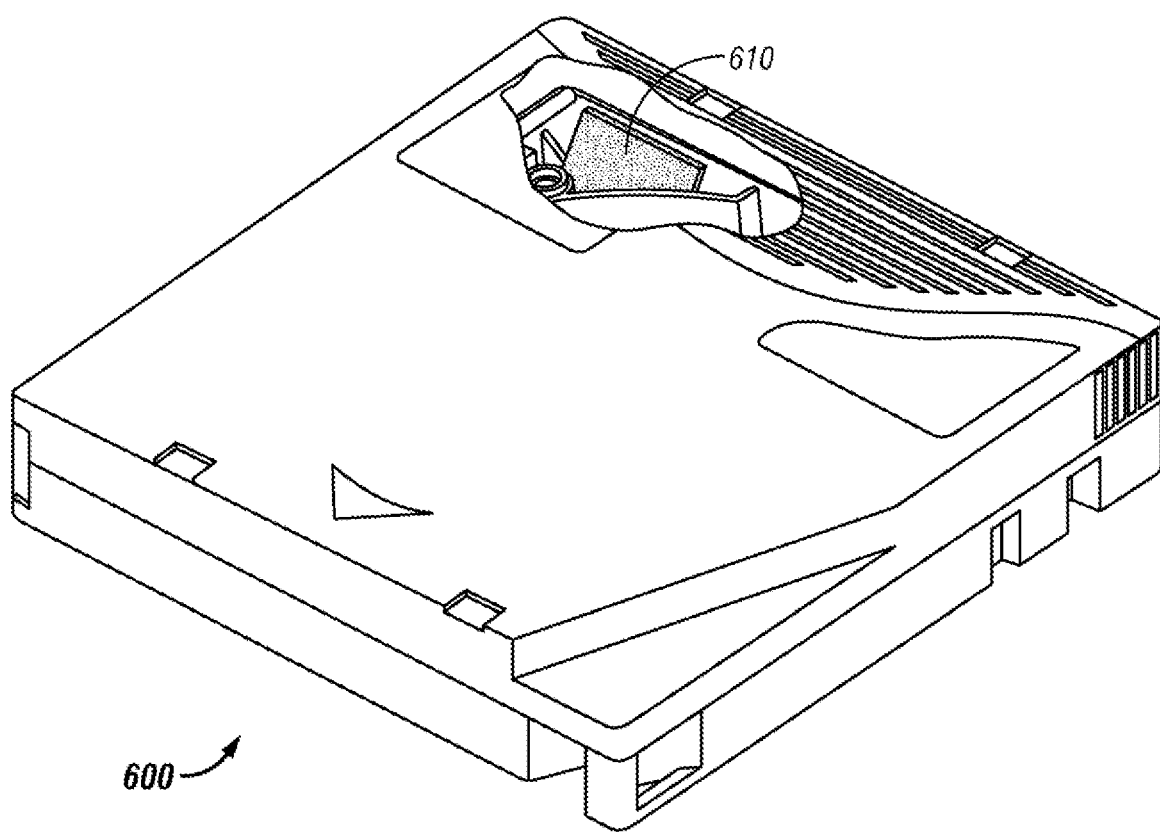
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
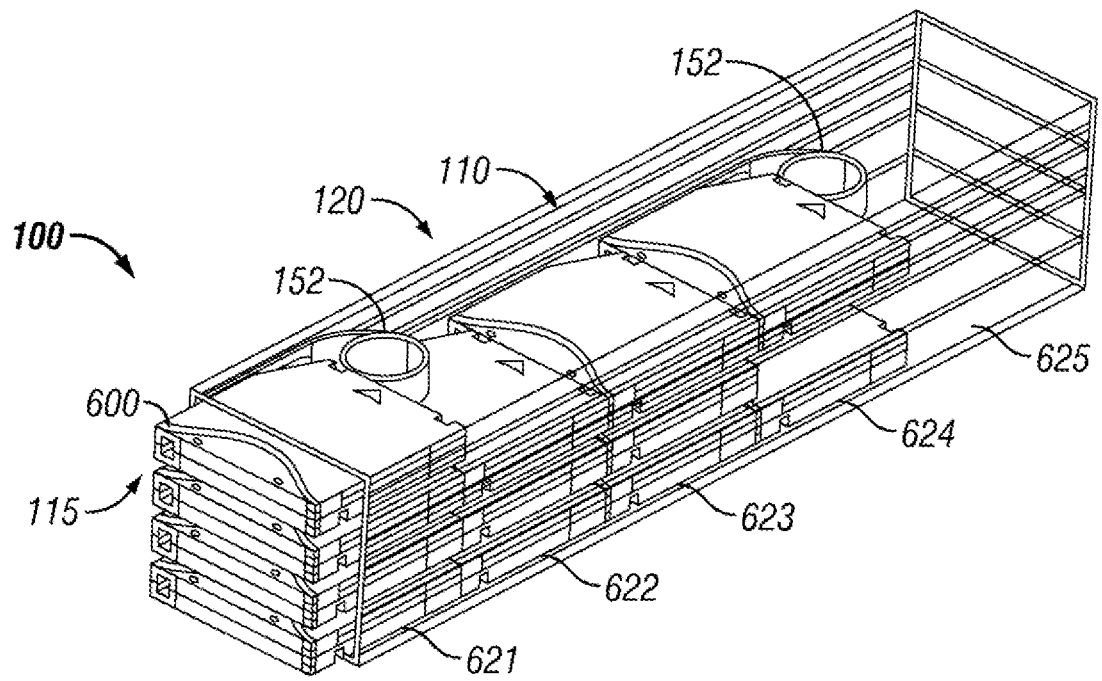
FIGS. 7A-7B are perspective views of a multi-cartridge deep slot cell according to one embodiment.
Figure 7B:
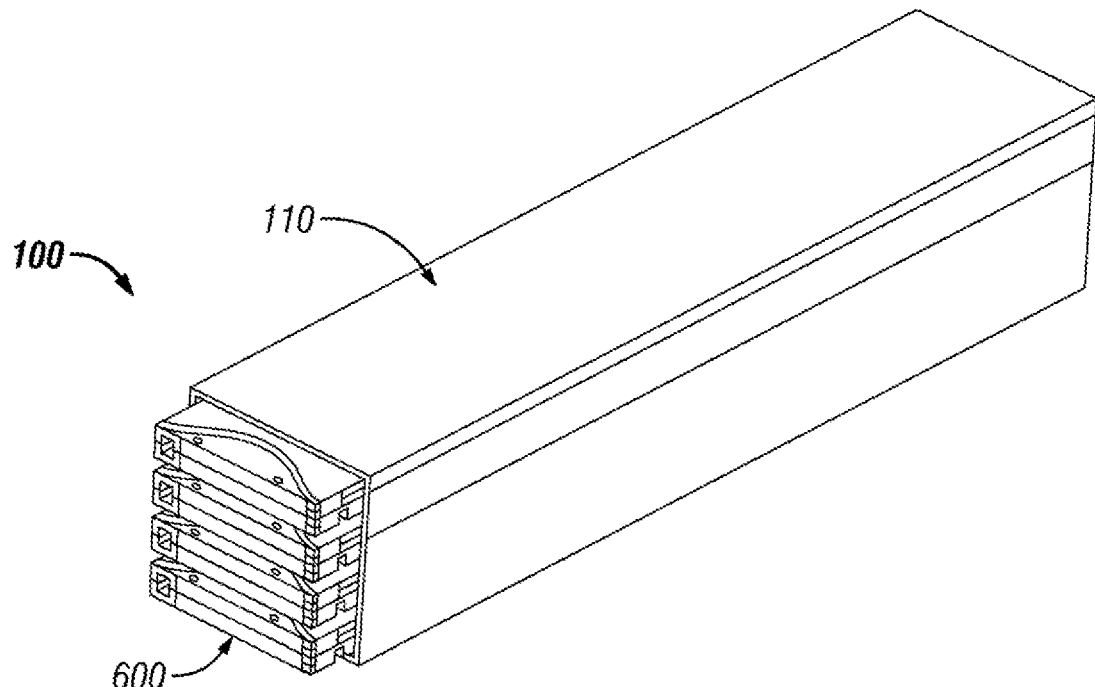

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
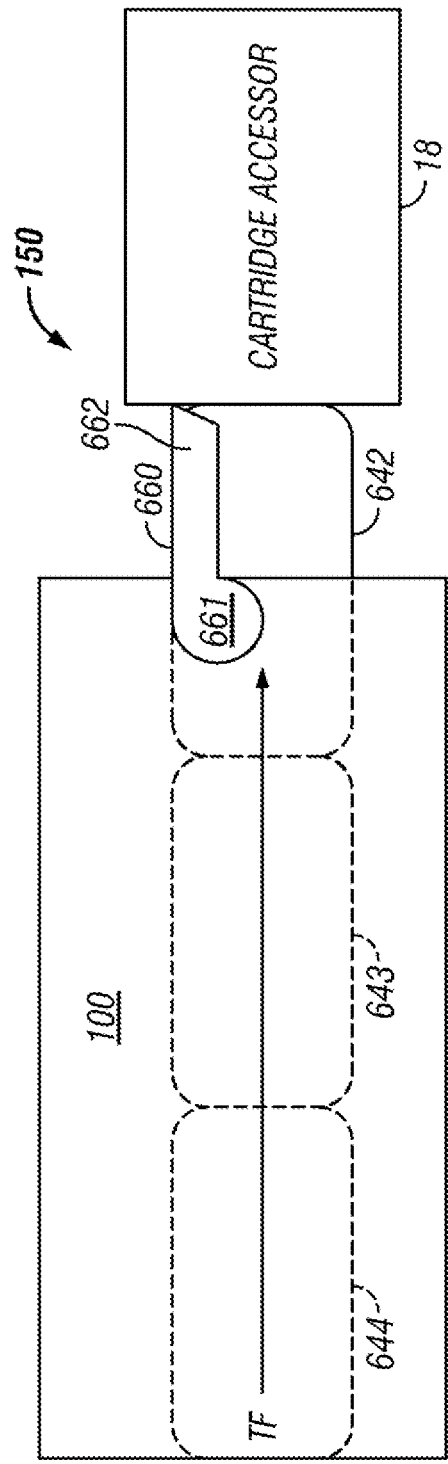

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8B:
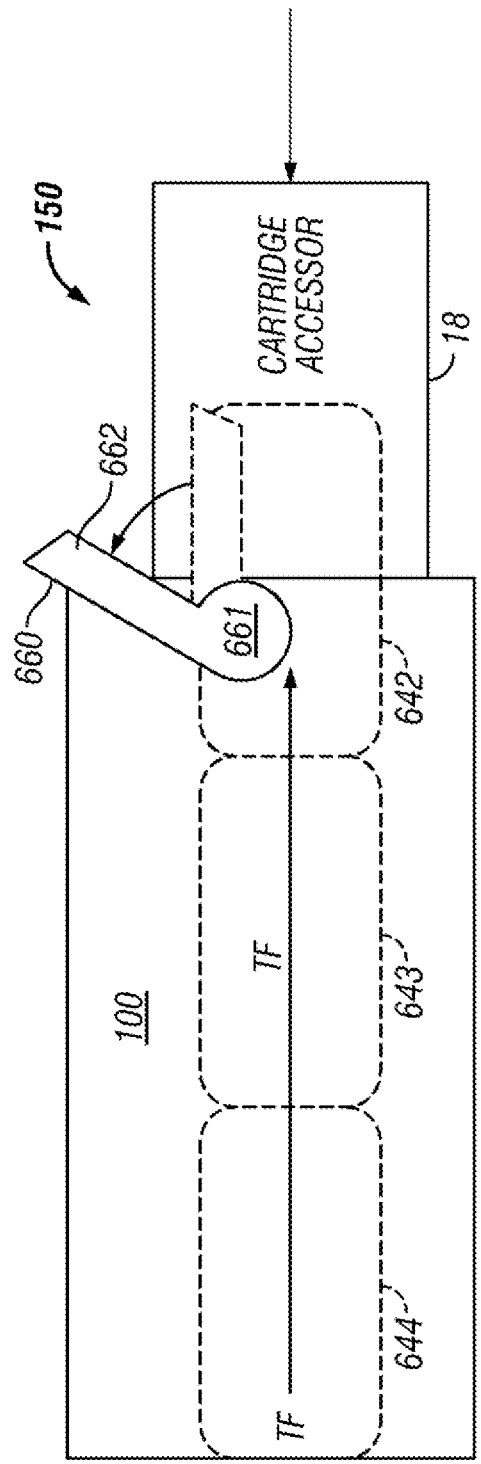

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
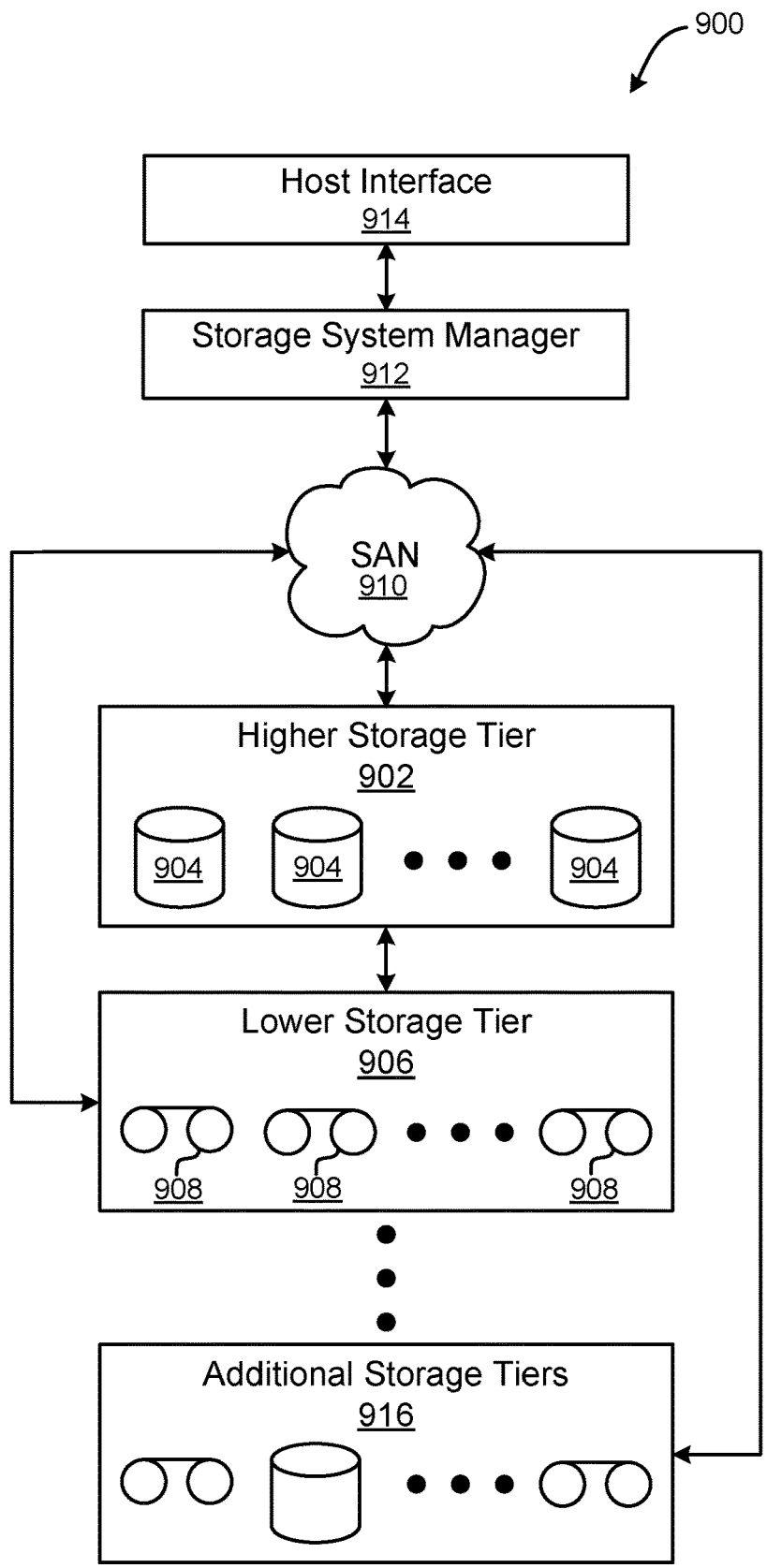
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As described above, magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

Moreover, file systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant magnetic tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in conventional tape products having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 10:
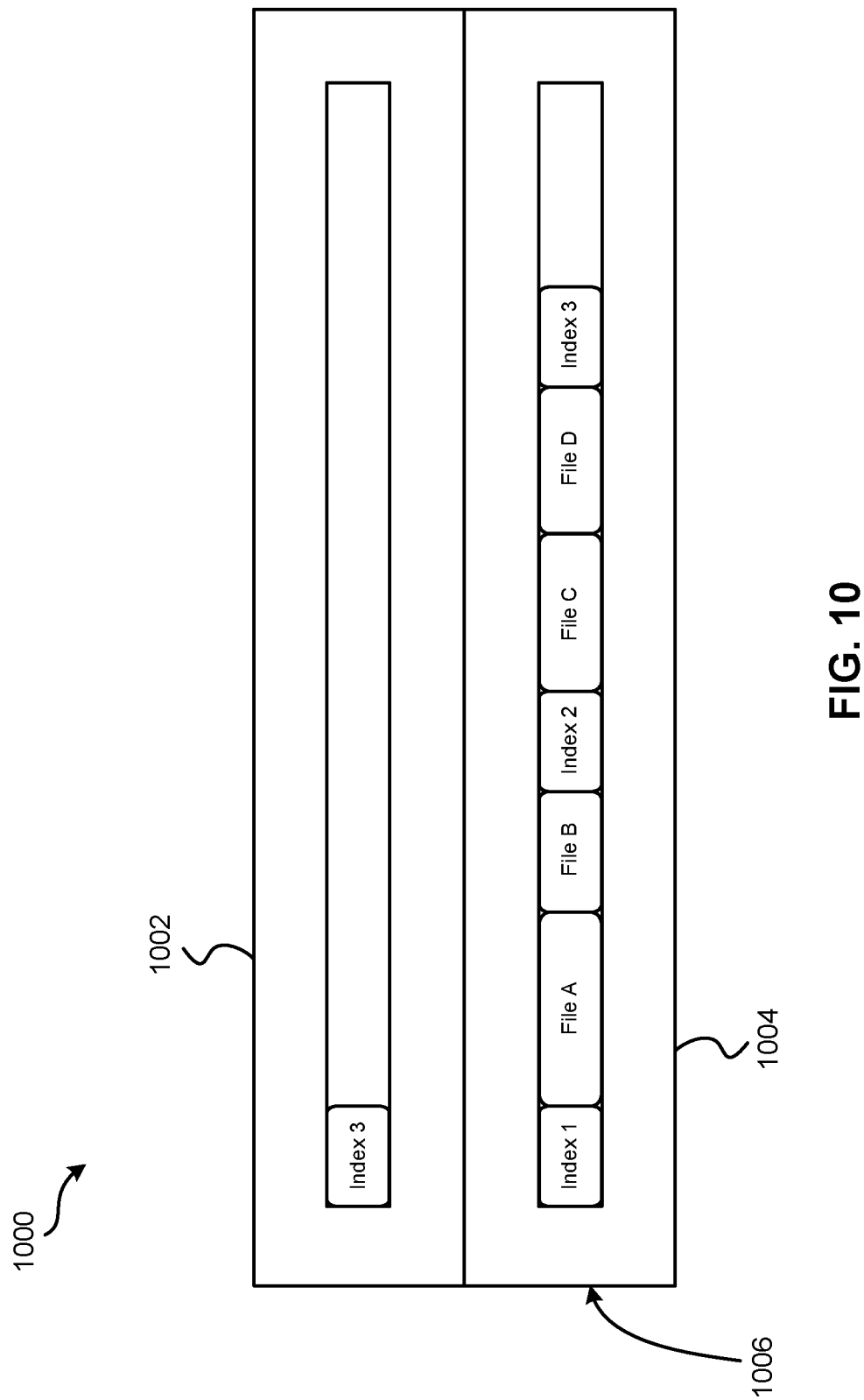
FIG. 10 is a representational diagram of files and indexes stored on a magnetic tape according to one embodiment.

Looking to FIG. 10, a magnetic tape 1000 having an index partition 1002 and a data partition 1004 is illustrated according to one embodiment. As shown, data files and indexes are stored on the tape. The LTFS format allows for index information to be recorded in the index partition 1002 at the beginning of tape 1006, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 10, a most recent version of metadata Index 3 is recorded in the index partition 1002 at the beginning of the tape 1006. Conversely, all three version of metadata Index 1, Index 2, Index 3 as well as data File A, File B, File C, File D are recorded in the data partition 1004 of the tape. Although Index 1 and Index 2 are old (e.g., outdated) indexes, because information is written to tape by appending it to the end of the previously written data as described above, these old indexes Index 1, Index 2 remain stored on the tape 1000 in the data partition 1004 without being overwritten.

The metadata may be updated in the index partition 1002 and/or the data partition 1004 differently depending on the desired embodiment. According to some embodiments, the metadata of the index partition 1002 may be updated in response to the tape being unmounted, e.g., such that the index may be read from the index partition when that tape is mounted again. The metadata may also be written in the data partition 1004 so the tape may be mounted using the metadata recorded in the data partition 1004, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Magnetic tapes are a desirable data storage medium in view of their relatively large capacity and desirable portability. However, ease of portability also exposes magnetic tapes to theft. In case of theft or loss of a magnetic tape having data stored thereon, conventional products include ways of protecting the data on the tapes, namely by encrypting the data. Conventional manners in which data on magnetic tape is encrypted in conventional products may be broadly grouped into the following three categories.

First, application managed encryption (AME) includes an application which operates a tape library or tape drive, and provides a key to the tape drive. The tape drive then encrypts data using the key and writes it to a magnetic tape in real time. Second, system managed encryption (SME) involves a library or a driver of a tape drive automatically acquiring a key for a magnetic tape from a key manager and providing the key to the tape drive. The tape drive then encrypts data with the key and writes the encrypted data to the magnetic tape in real time. Finally, for library managed encryption (LME), a tape drive automatically acquires a key for a magnetic tape from a key manager via a library. The tape drive then encrypts data and writes it to the magnetic tape in real time. SME and LME are application-transparent, and therefore the application does not know whether the data has been encrypted or not. Whether the data is encrypted or not actually depends on settings of the driver in the case of SME, and depends on settings of the tape library in the case of LME.

Moreover, for these conventional encryption implementations, encryption for a magnetic tape is controlled in such a manner that either all data stored on the tape is encrypted, or none of the data stored on the tape is encrypted at all. Each tape that includes encrypted data is thereby assigned a different cryptographic key, and users authorized to access the data on a tape are given the cryptographic key corresponding thereto. However, with the increase in capacity of magnetic tape media in recent years, it has become common to share one tape with multiple entities or to lend out an archived tape. It follows that multiple users are given access to all data stored on a same tape.

This is particularly undesirable in cases where a user is permitted to access some of the data stored on a magnetic tape, but not other portions of the data, as these conventional products are unable to address this situation.

In sharp contrast to the foregoing shortcomings experienced in conventional products, various embodiments described herein are able to encrypt metadata associated with the directory corresponding to a file, and/or metadata associated with the file itself. Moreover, different portions of the metadata associated with the directory corresponding to a file, and/or metadata associated with the file itself may be encrypted with different keys. Accordingly, by encrypting the metadata as described herein, different entities (e.g., users) may be given keys that decrypt the metadata associated with certain directories and/or files depending on the amount of access the different entities are permitted. As a result, some of the embodiments described herein are able to achieve added granularity in terms of the security afforded for a given magnetic tape, and allows for multiple users to access different portions of the information stored in a single magnetic tape without compromising the security of the data, e.g., as will be described in further detail below.

It should be noted that the term "key" or "keys" as used herein are intended to refer to encryption and/or decryption keys as would be appreciated by one skilled in the art after reading the present description. Accordingly, the term "key" or "keys" as used herein may include private signature keys, symmetric authentication keys, symmetric data encryption keys, symmetric key wrapping keys, private static key agreement keys, etc., or any other type of encryption and/or decryption keys which would be apparent to one skilled in the art after reading the present description.

Referring back momentarily to FIG. 10, files (including records) and indexes (which store a directory structure and file metadata), are alternately written to the magnetic tape. For a tape having a LTFS format, the tape is partitioned into an index partition (e.g., see 1002) and a data partition (e.g., see 1004). The index partition mainly stores indexes and is typically smaller than the data partition. However, the data partition stores both indexes and the content of files, and is thereby typically larger than the index portion.

As alluded to above, an index stores metadata corresponding to files written prior to that index. For example, Index 2 has recorded therein metadata of File A and File B, and a tree structure of directories held until just before Index 2 was formed.

An index may be written in Extensible Markup Language (XML), in which a file (e.g., specific grouping of data) is described by elements included in file tags, and a directory is described by elements included in directory tags. Moreover, a tree structure associated with the file may be described by nesting directory tags, e.g., as would be appreciated by one skilled in the art after reading the present description.

Looking now to FIG. 11, computer code forming an exemplary file tag 1100 is depicted in accordance with one embodiment. As an option, the present file tag 1100 may be implemented in conjunction with features from any other embodiment listed herein, such as those described with reference to the other FIGS. However, such file tag 1100 and others presented herein may be used in various applications and/or in permutations which may or may not be specifically described in the illustrative embodiments listed herein. Further, the file tag 1100 presented herein may be used in any desired environment. Thus FIG. 11 (and the other FIGS.) may be deemed to include any possible permutation.

As shown, the file tag 1100 includes metadata describing the file name ("file1", a logical size of the file ("17686403"), an R/O flag, one or more timestamps, a file number (i-node number), metadata describing blocks in the file ("extentinfo", "extent"), etc.

Specifically, looking to the metadata included in file tag 1100, it can determined that the file file1 begins at record 115 "<startblock>115</startblock>" of partition b "<partition>b</partition>", and includes 17,686,403 bytes "<bytecount>17686403</bytecount>" which likely correspond to 35 records (e.g., as one record is typically 512 Kilobytes). Accordingly, the record numbers of the records which make up the file may be calculated based on the metadata under <extentinfo> and <extent>.

However, were any of this metadata included in file tag to be encrypted, with one or more given keys, a user without a correct key may be precluded from accessing file metadata, and therefore would be unable to access, or even locate, the file associated therewith. It follows that various approaches described herein may allow the ability to allow select users the ability access only one or more select files they are permitted to access.

Figure 12:
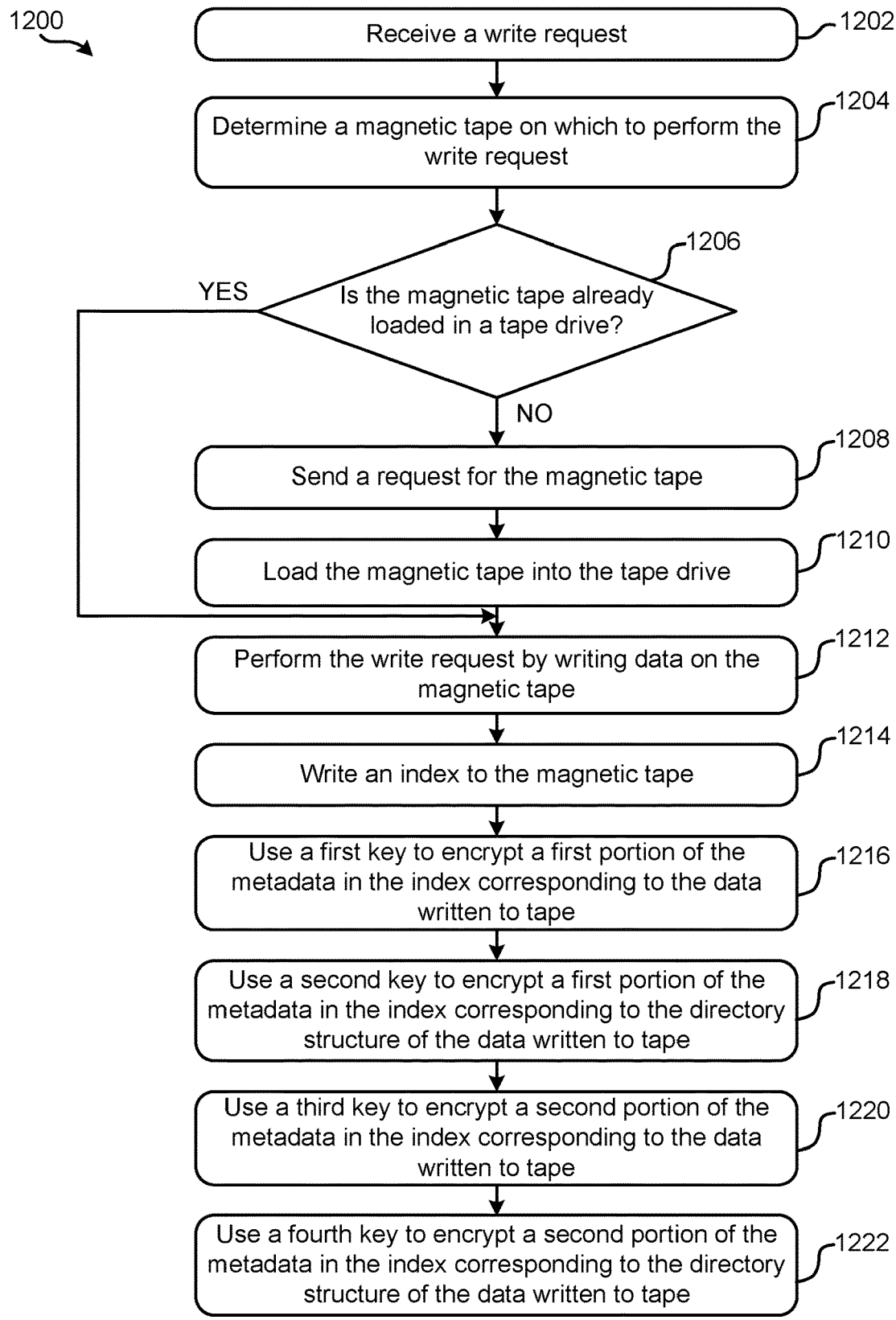
FIG. 12 is a flowchart of a method according to one embodiment.

Now referring to FIG. 12, a flowchart of a computer-implemented method 1200 for encrypting metadata on a magnetic tape is shown according to one embodiment. The method 1200 may be performed in accordance with the present invention in any of the environments depicted in FIGS. 1-11, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, any one or more of the processes included in method 1200 may be performed by a tape drive and/or any components included therein. In various other embodiments, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, operation 1202 of method 1200 includes receiving a write request. Depending on the approach, the write request may be received from a user, a host, a system controller, etc. Moreover, operation 1204 includes determining a magnetic tape on which to perform the write request received. In some approaches, the write request may identify which specific magnetic tape to perform the write request on, e.g., when the write request involves updating (overwriting) certain data previously written to a specific magnetic tape. Accordingly, operation 1204 may be performed by inspecting the write request. However, in other approaches, the write request may not correspond to a specific magnetic tape. Thus, operation 1204 may include determining a magnetic tape having an adequate amount of free space thereon and/or which has a lowest access time associated therewith, e.g., depending on where the magnetic tape is stored. For example, a magnetic tape stored next to a tape drive may be selected rather than a magnetic tape stored in a back corner of a storage library far from the tape drive. In yet another example, a magnetic tape which is currently loaded in a tape drive and which has an adequate amount of free space thereon to perform the write request may desirably be selected.

Moreover, decision 1206 includes determining whether the magnetic tape determined in operation 1204 is already loaded in a tape drive. As described above, a magnetic tape which is currently loaded in a tape drive and which has an adequate amount of free space thereon to perform the write request may desirably be selected to perform the write request in order to minimize latency. As shown, method 1200 jumps to operation 1212 in response to determining that the magnetic tape is already loaded in a tape drive. There, operation 1212 includes performing the write request, e.g., as will be described in further detail below.

However, returning to decision 1206, method 1200 proceeds to operation 1208 in response to determining that the magnetic tape determined in operation 1204 is not already loaded in a tape drive. There, operation 1208 includes sending a request for the magnetic tape. Depending on the embodiment, the magnetic tape may be retrieved in response to the request sent in operation 1208 a number of different ways. According to one approach, the magnetic tape may be stored in a tape library, whereby an automated robotic accessor may retrieve the magnetic tape from a storage cell, and transport it to a tape drive. In another approach, the request may be sent to a user who is prompted to insert a tape cartridge into a receiving slot of a tape drive.

Once the magnetic tape has been received at the tape drive, operation 1210 includes loading the magnetic tape into the tape drive, e.g., using any of the approaches described above. For example, the magnetic tape may be threaded over guides, across a magnetic head of the tape drive, and onto a take-up reel. Accordingly, tape may be passed from the supply spool, over the magnetic head and onto to the take-up reel in order to locate a desired location on the magnetic tape, e.g., as would be appreciated by one skilled in the art after reading the present description.

Once a desired location on the magnetic tape has been positioned adjacent (under) the magnetic head of the tape drive, operation 1212 includes performing the write request by writing data on the magnetic tape. Accordingly, operation 1212 may include writing a file, a portion of a file, multiple files, etc. and/or combinations thereof to the magnetic tape. It should also be noted that the data may be compressed before it is written to the magnetic tape, e.g., to facilitate efficient use of data storage. In preferred approaches, the data written on the magnetic tape is stored thereon according to a LTFS format, as magnetic tapes having data stored in the LTFS format are desirably characterized by large capacity and a respectable portability.

Moreover, as previously mentioned, various ones of the approaches described herein allow for metadata to be encrypted without effecting the actual data in the file(s) itself. Accordingly, in some approaches the data in the file itself may not be encrypted at all. However, in other approaches, the data in the file may be encrypted using a key which is preferably different than any of the other keys which may be used to encrypt metadata stored on the magnetic tape, e.g., as described in further detail below. In such approaches, data written to the magnetic tape may be encrypted using any encryption processes which would be apparent to one skilled in the art after reading the present description.

Furthermore, operation 1214 includes writing an index to the magnetic tape. The index is preferably written to the data partition of the magnetic tape, e.g., such that it is not later overwritten by a subsequently written index, but it may also be written to the index partition of the magnetic tape as well. Referring back momentarily to FIG. 11, it has been described that an index preferably includes metadata which corresponds to the data (e.g., file) written to the magnetic tape while performing the write request, as well as metadata which corresponds to a directory structure of the data (e.g., file) written. According to an example, metadata corresponding to a file itself may include a name of the file, a size of the file, a starting location of the file, etc., while metadata corresponding to a directory structure of a file may include a tree structure associated with the file.

According to some approaches, an index may be written using XML. Accordingly, the metadata in the index corresponding to the file may include file tags, while the metadata in the index corresponding to the directory structure of the file may include directory tags. However, in other approaches one or more indexes may be written using any language which would be apparent to one skilled in the art after reading the present description.

Referring still to FIG. 12, operation 1216 includes using a first key to encrypt a first portion of the metadata in the index corresponding to the data written to tape, while operation 1218 includes using a second key to encrypt a first portion of the metadata in the index corresponding to the directory structure of the data written to tape. Furthermore, operation 1220 includes using a third key to encrypt a second portion of the metadata in the index corresponding to the data written to tape, while operation 1222 includes using a fourth key to encrypt a second portion of the metadata in the index corresponding to the directory structure of the data written to tape.

It follows that method 1200 allows for metadata corresponding to the content of a file and the content of a file directory in an index to be encrypted and stored on a magnetic tape such that different metadata ultimately revealed to different users having different keys depending on their respective level of access. Thus, an entity which issues an access request is only allowed to access data (e.g., one or more files) which the entity is permitted to see. Moreover, it may be desirable to encrypt the metadata corresponding to a file as well as the metadata corresponding to the directory structure of the file such that an entity which is not permitted to access a particular file is not able to determine important information about the file from the directory structure metadata even though the file itself may not be accessible. Thus, the security benefits afforded by encrypting both the metadata corresponding to a file as well as the metadata corresponding to the directory structure of the file may be weighed with the resulting throughput placed on the tape drive and/or system as a whole, e.g., depending on the importance of the data, an exposure threat corresponding to the data, security of the tape library used to store the magnetic tape on which the data is written, available system bandwidth, a type of encryption implemented, etc.

As described above, the metadata in the index may be written in XML, and may therefore include file tags and/or directory tags. According to one approach, using the first key to encrypt the first portion of the metadata in the index corresponding to the file may include using the first key to encrypt at least one of the file tags. Moreover, in another approach, using the second key to encrypt the first portion of the metadata in the index corresponding to the directory structure of the file may include using the second key to encrypt at least one of the directory tags.

A desirable result of implementing hardware-based encryption of metadata at the tape drive level (e.g., as opposed to software-based encryption and/or third-party appliances), is that the tape drive may perform the encryption after the metadata is actually written to the magnetic tape. However, in other approaches, the metadata may be encrypted before it is written to the magnetic tape in the index. According to an exemplary approach, a cryptographic module included in a tape drive may be used to write encrypted data to the magnetic tape.

By using different keys to encrypt different portions of the index metadata, the data access granted to different entities may be controlled by the number of keys shared with a given entity. According to an illustrative example, which is in no way intended to limit the invention, a request to write files A, B, C and D to a magnetic tape is received by a tape drive. Once the magnetic tape is loaded in the tape drive, the tape drive writes files A, B, C and D to a data partition of the magnetic tape, followed by an index which includes metadata corresponding to each of the written files A, B, C and D. Thereafter, the tape drive uses Key 1 to encrypt metadata in the index corresponding to file A, Key 2 to encrypt metadata in the index corresponding to the directory structure of file B, Key 3 to encrypt metadata in the index corresponding to file C, and Key 4 to encrypt metadata in the index corresponding to the directory structure of files C and D. Accordingly, attempts to read any of files A, B, C or D without at least one of the keys to decrypt some of the encrypted metadata will be unsuccessful.

Moreover, unique combinations of Keys 1-4 may be given to different entities depending on a level of access corresponding thereto. For instance, Key 1 may simply be shared with a user that is permitted to access file A, while Keys 3 and 4 may be shared with a business that is permitted to access files C and D. Accordingly, although files A, B, C and D are all stored on a same magnetic tape, the manner by which the metadata associated with these files has been encrypted allows for a number of different entities to access certain ones of the files without compromising the security of other ones of the files. In another approach Keys 1 and 2 may be assigned to a first user, while Keys 3 and 4 are assigned to a second user. Keys may be shared with appropriate entities by sharing a copy of the key(s) to the appropriate entity, sending the actual key(s) to an entity, storing an indication of which entities have access to certain keys in memory (e.g., a lookup table), etc.

Further still, depending on which key an entity has and/or the manner in which the metadata has been encrypted, the data stored on the magnetic tape may be displayed to an entity differently. Referring still to the illustrative example in which metadata of files A-D were encrypted using Keys 1-4 above, a user who has a copy of Key 4 may be able to decrypt portions of files C and D. Looking to file D, because the metadata in the index corresponding to file D was not encrypted, and the metadata in the index corresponding to the directory structure of file D has been decrypted, the user has gained access to file D. However, the user may not have access to file C even though Key 4 has allowed them to decrypt metadata in the index corresponding to the directory structure of file C. This is because the metadata in the index corresponding to file C was encrypted with Key 3, which the user does not have access to.

Figure 13:
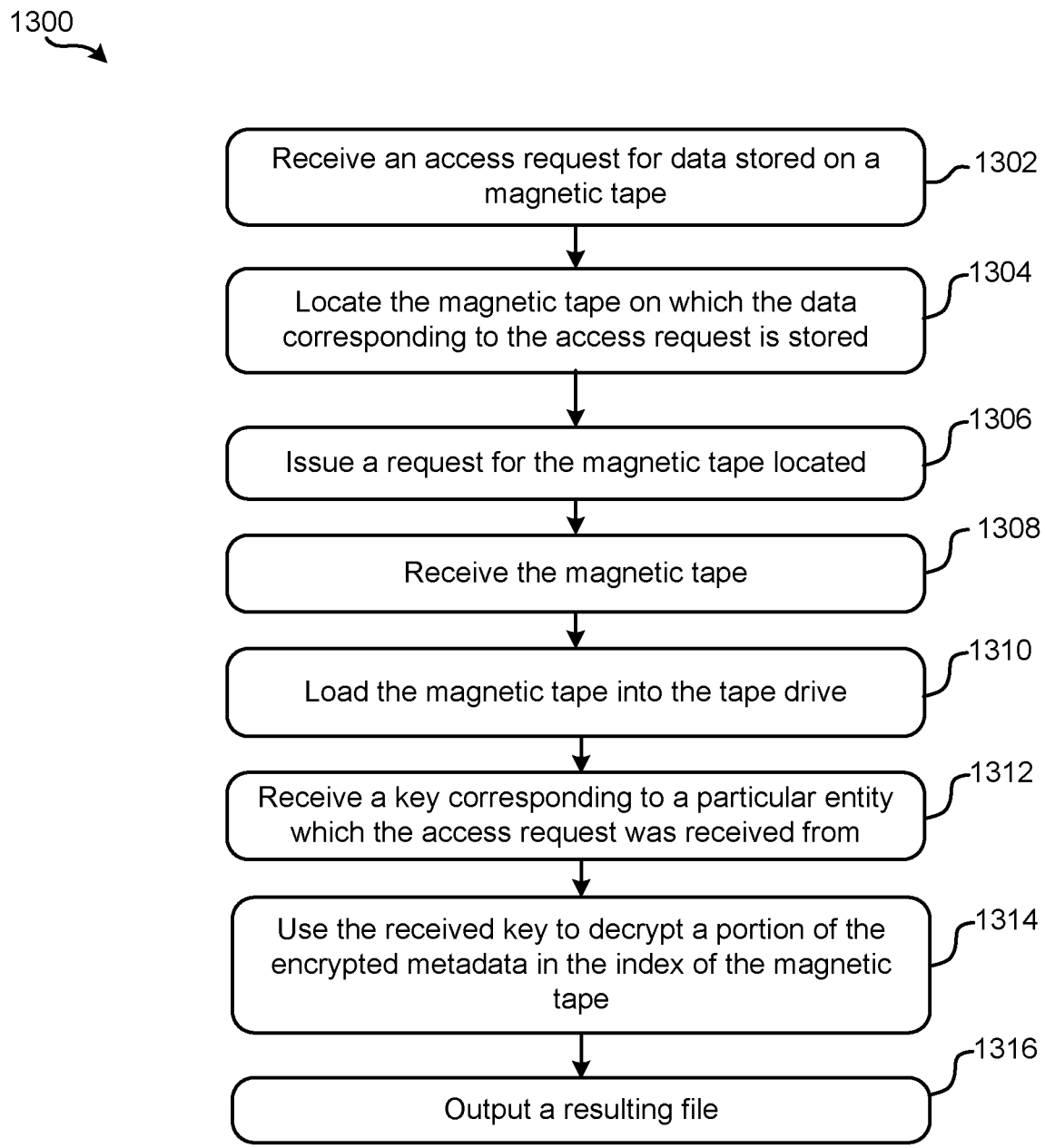
FIG. 13 is a flowchart of a method according to one embodiment.

It follows that the manner in which keys are used to decrypt metadata, and the resulting access, may vary depending on the approach, e.g., as seen in method 1300 of FIG. 13. Now referring to FIG. 13, a flowchart of a computer-implemented method 1300 for decrypting metadata on a magnetic tape is shown according to one embodiment. The method 1300 may be performed in accordance with the present invention in any of the environments depicted in FIGS. 1-12, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, any one or more of the processes included in method 1300 may be performed by a tape drive and/or any components included therein. In various other embodiments, the method 1300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, operation 1302 of method 1300 includes receiving an access request (e.g., a read request) for data stored on a magnetic tape. Depending on the approach, the access request may be received from a user, a host, a controller, etc. The data may be stored on the magnetic tape according to a linear tape file system format.

As previously described, magnetic tape includes indexes having metadata corresponding to files stored on the magnetic tape and metadata corresponding to a directory structure of the files. Moreover, at least some of the metadata may be encrypted. According to some approaches, metadata corresponding to the files stored on the magnetic tape may be encrypted with a first key, while in other approaches metadata corresponding to the directory structure of the files may be encrypted with a second key. According to other approaches, different portions of the metadata corresponding to the files may be encrypted with different with different keys. Different portions of the metadata corresponding to the directory structure of the files may also be encrypted with different keys. Accordingly, different combinations of keys may be used to decrypt different portions of the metadata, e.g., in order to access the data corresponding thereto. Moreover, unique combinations of keys used to encrypt the different portions of the metadata may be assigned to different entities (e.g., users) depending on the amount, type, portions, etc. of data stored on a magnetic tape the different entities are permitted to access.

Operation 1304 includes locating the magnetic tape on which the data corresponding to the access request is stored. Operation 1306 also includes issuing a request for the magnetic tape located in operation 1304. Furthermore, operation 1308 includes receiving the magnetic tape, and operation 1310 includes loading the magnetic tape into the tape drive. As described above, magnetic tapes may be stored in different locations depending on the particular approach. For instance, in some approaches, magnetic tapes may be housed in respective tape cartridges which in turn are stored in storage cells (e.g., slots) of a tape library. Each of the cartridges in the storage cells may be accessed by a robotic accessor, and the robotic accessor may transport tape cartridge to a tape drive and/or between storage cells.

It should also be noted that in some approaches, the magnetic tape on which the data corresponding to the access request is stored may already be loaded (e.g., mounted) in a tape drive. Accordingly, operations 1306, 1308, and 1310 may be skipped in some circumstances, e.g., when the magnetic tape need not be moved and/or loaded in order to perform the access request.

Referring still to FIG. 13, operation 1312 includes receiving a key corresponding to a particular entity which the access request was received from. For instance, the access received in operation 1302 may have been received from a particular user which has a key corresponding thereto. As previously described, different users may be designated different keys depending on an amount of information they are permitted to access on the magnetic tape. Moreover, the key(s) that a particular entity (e.g., user) has been assigned may be stored in memory, e.g., such as a lookup table. It should be noted that a tape drive performing operation 1312 or any of the other processes described in method 1300 may be the same or different tape drive which was used to actually write and/or encrypt the metadata, e.g., as would be appreciated by one skilled in the art after reading the present description. Thus, operation 1312 may be performed by sending a request to a location that the encryption keys are stored, e.g., such as a key/encryption management module, a key server set in a tape storage library, another tape drive which was originally used to write and/or encrypt the metadata, etc.

The one or more keys received in response to the request sent may be used to set the hardware in the tape drive, preferably such that the tape drive is able to decrypt metadata and read at least some of the data stored on the magnetic tape. As previously mentioned above, the metadata in the index may be written in XML, and may therefore include file tags and/or directory tags. According to one approach, a first key may have been used to encrypt the first portion of the metadata in the index corresponding to the file by encrypting at least one of the file tags with the first key. Moreover, in another approach, a second key may have been used to encrypt the first portion of the metadata in the index corresponding to the directory structure of the file by encrypting at least one of the directory tags with the second key. However, the metadata may be encrypted differently depending on the desired approach. Accordingly, operation 1314 includes using the received key to decrypt a portion of the encrypted metadata in the index of the magnetic tape. Again, different types of metadata written to the magnetic tape may be encrypted with different keys. Thus, depending on which one or more keys are retrieved based on a level of access permitted to the particular entity which issued the access request, the amount and type of metadata which may be decrypted with the retrieved key(s) varies.

Once a portion of the encrypted metadata has been decrypted with the one or more retrieved keys, operation 1316 includes outputting (e.g., for display) a resulting file. The resulting file output in operation 1316 preferably corresponds to the data included in the access request originally received in operation 1302. Accordingly, the "resulting file" which is actually output may actually be a portion of a file, a whole file, multiple files, multiple portions of multiple files, etc., and/or combinations thereof. In addition to the actual data included in the file, directory information corresponding to the file may also be output in operation 1316, e.g., such as a size of the file, a name of the file, a storage location of the file, etc.

Outputting the resulting file may be performed in some approaches by sending the resulting file and/or any directory information corresponding to the file to a read buffer. Moreover, the read buffer may compile the data included in the resulting file and/or any directory information before sending it in response to the originally received access request (e.g., to a user). However, prior to decrypting metadata in the index corresponding to a directory structure of a file (e.g., data) written to tape and/or corresponding to the file itself, the file may not be accessible at all. In other words, a file having encrypted metadata may be completely undetectable by a tape drive and therefore may not be included in a response to the access request originally received, regardless of whether the file was included in the request, e.g., depending on the approach. This is because the metadata corresponding to a given file and/or the directory structure thereof is used by the tape drive to, among other things, locate the actual file on the tape. Thus, without being able to decrypt the metadata, the tape drive has no way of knowing where to search for the file on the magnetic tape, what the name of the file is, how long the file is, etc., as would be appreciated by one skilled in the art after reading the present description. Thus, even assuming the tape drive were to read the entire tape and assuming that the data itself is not encrypted also, the tape drive would have no way of knowing which portion of the data read corresponded to the access request received.

Depending on the desired approach, metadata that has not been decrypted may either be concealed (e.g., not included) in the resulting file which is ultimately output, or it may be included in the resulting file output, but in encrypted form. Thus, according to some approaches, the information sent in response to the access request may intentionally still be in encrypted form. In yet other approaches, incorrect information may be returned in response to the received access request when the metadata has not been decrypted. In other words, the information returned may be used to disguise the actual data corresponding thereto. For example, the information returned in response to an access request which was not able to decrypt the metadata may incorrectly indicate: that the corresponding file is small in size when it is actually a large file, a starting position of the file, a name of the file, etc., depending on the desired approach. It follows that whether or not the encrypted metadata is returned in response to the access request may depend on whether the entity that issued the access request should know that the information included in the access request is actually located on the magnetic tape, but is nevertheless inaccessible by the entity. Thus, in certain situations it may be more desirable to exclude and/or falsify metadata which was not decrypted when compiling a resulting file output in response to the access request.

Moreover, as previously mentioned, the data itself may also be encrypted in some approaches. Again, data written to the magnetic tape may or may not be encrypted. Accordingly, in some approaches the data may simply be read by the tape drive after the metadata corresponding thereto has been decrypted. However, in other approaches the data may also be decrypted before the data may be read by the tape drive. In such approaches, the tape drive may acquire a corresponding key, e.g., from a key server that is set in the library, and set the key in the hardware of the tape drive. Moreover, a cryptographic module in the tape drive may be used to read and decrypt the encrypted data on the tape using the received key. In preferred approaches the key used to decrypt the data is a different key than the key(s) used to decrypt the metadata, but in some approaches one or more of the keys may have dual functionality and may be able to decrypt metadata and data.

It follows that method 1300 allows for metadata corresponding to the content of a file and the content of a file directory in an index to be encrypted and stored on a magnetic tape such that different metadata ultimately revealed to different users having different keys depending on their respective level of access. Thus, an entity which issues an access request is only allowed to access data (e.g., one or more files) which the entity is permitted to see.

Referring now to FIGS. 14A-14B, an in-use example of computer code 1400, 1450 related to encrypting metadata is illustrated which is in no way intended to limit the invention. Rather, the present computer code 1400, 1450 may be implemented in conjunction with features from any other embodiment listed herein, such as those described with reference to the other FIGS., such as FIGS. 11-13. However, such computer code 1400, 1450 and others presented herein may be used in various applications and/or in permutations which may or may not be specifically described in the illustrative embodiments listed herein. Further, the computer code 1400, 1450 presented herein may be used in any desired environment. Thus FIGS. 14A-14B (and the other FIGS.) may be deemed to include any possible permutation.

The in-use example of FIGS. 14A-14B depicts the entire block <name>dir1</name> as being encrypted with Key1, while file 2<name>file2</name> is encrypted with Key2. Accordingly, Key1 is used to encrypt metadata in the index corresponding to file1 as well as to encrypt metadata in the index corresponding to the directory structure of file1, while Key2 is used to encrypt metadata in the index corresponding to file2. It follows that metadata in the index corresponding to the directory structure of file2 is not encrypted and may therefore be accessed without first decrypting it. Moreover, a <file> tag pair for the file desired to be encrypted is not encrypted. A <directory> tag pair for the directory desired to be encrypted is also not encrypted, but subdirectories between the <directory> tag pair are encrypted, including <directory> tag pairs for the subdirectories.

Looking specifically to FIG. 14A, the computer code 1400 included therein is depicted prior to encryption of the metadata, while the computer code 1450 in FIG. 14B shows the same metadata, but in encrypted form. According to the in-use example, Key1 may be assigned to User1 while Key2 is assigned to User2, thereby giving User1 the ability to decrypt metadata corresponding to file1 and thereafter access the data in file1, and giving User2 the ability to decrypt metadata corresponding to file2 and thereafter access the data in file2. Thus, although file1 and file2 are stored on the same magnetic tape, User1 and User2 can each use (e.g., read from) the magnetic tape without compromising the security of the data stored on the magnetic tape which each respective user is not permitted (cleared) to access.

The encrypted portions of the metadata illustrated in FIG. 14B may eventually be processed with a text encoding scheme, e.g., such as base64, and stored thereafter. According to one approach, the processed metadata may be stored as XML data with an "<encryptedmeta>" tag, e.g., as would be appreciated by one skilled in the art after reading the present description. Moreover, when attempting to read the index metadata included in FIGS. 14A-14B, a tape drive may attempt to decrypt the content of the <encryptedmeta> tags with keys. If the decryption succeeds, the tape drive may output the resulting file and the directory information, e.g., via a file system.

As shown in FIGS. 14A-14B, and as described above, it may not be necessary to encrypt all metadata corresponding to a given file or directory information thereof in order to ensure security of the data itself. For example, looking to the computer code 1400 in FIG. 14A, only an <extentinfo> tag for a file may be encrypted, whereby the file name may be referred to, but an attempt to read the content will result in failure to access the data, because the information on the records which makes up the actual file is still encrypted and therefore "hidden" from being accessed. In another example, looking now to the computer code 1450 of FIG. 14B, only <startblock> under <extent> may be encrypted, and the encrypted number may be converted into text and written directly, without being processed with a text encoding scheme, e.g., such as base64. In this example, the metadata including the file name can be correctly referred to, but incorrect data may be intentionally returned when the file is read. In still further examples, only the file name and/or the directory name may be encrypted.

When a partially encrypted index is read, decryption of the encrypted portions is attempted. As previously mentioned, in some approaches the information may be shown to an entity which issued an access request for the information only if the decryption succeeds. However, in other approaches, even if the decryption fails, incorrect information may still be shown to the requesting entity. In a situation such as that illustrated in FIGS. 14A-14B, it is preferred that the information be shown to the requesting entity only if the decryption succeeds. However, if only <startblock> under <extent> is encrypted in an alternate example, incorrect information may still be presented to the requesting entity even if the decryption fails.

Moreover, in some approaches, a common key of the common key cryptosystem may be encrypted with each respective entity's (e.g., user's) public key of the public key cryptosystem. This process may produce a key encrypted key (KEK) for each of the entities. Moreover, the encrypted common key may be stored in the index. Using such a KEK may enable only a certain portion a magnetic tape that has been lent out to be shown to a borrower of the lent out magnetic tape, and may thereby be implemented in any of the approaches described herein.

It should again be noted that the encryption of metadata according to any of the approaches described herein does not conflict with conventional encryption processes which may be performed on a magnetic tape. Accordingly, although any of the approaches described herein may be used to encrypt and/or decrypt the metadata included in an index, other encryption processes may be used to encrypt and/or decrypt the actual data stored on the magnetic tape. For instance, using LME in addition to any of the approaches described herein may enable data to be protected against direct reference to records in a lost tape by a non-library edition, which has been unachievable in conventionally products.

Furthermore, any of the approaches described herein may be implemented in various storage configurations. For example, any of the approaches included herein may be implemented in single drive based systems which support standalone drives, library based systems which support tape libraries, enterprise based systems which support hardware security modules, etc.

It follows that various ones of the approaches described and/or suggested herein include encrypting metadata associated with the directory corresponding to a file, and/or metadata associated with the file itself. Moreover, this encryption may be implemented without effecting the data actually included in the file itself. In fact, the data in the file itself may not be encrypted at all. However, in some approaches the data in the file may be encrypted using another key, e.g., according to any desired encryption processes.

By encrypting the metadata as described herein, different users may be given keys that decrypt the metadata associated with directories and/or files depending on the amount of access the different users are desired to be given. This provides some added granularity in terms of the security afforded for a given magnetic tape, and allows for multiple users to access different portions of the information stored in a single magnetic tape without compromising the security of the data. This is affords a significant improvement over conventional LTFS encryption methods which are faced with the undesirable decision of either encrypting the entire tape with a same key, or not at all.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method for encrypting metadata on a magnetic tape, comprising:
   identifying a magnetic tape in a storage library having a plurality of magnetic tapes therein, wherein the identified magnetic tape has an adequate amount of free space thereon to perform a write request and has a lowest access time associated therewith in comparison to access times associated with a remainder of the magnetic tapes in the storage library;
   determining whether the magnetic tape is currently loaded in a tape drive;
   sending one or more instructions to load the magnetic tape into the tape drive in response to determining that the magnetic tape is not currently loaded in a tape drive;
   writing a file to the magnetic tape;
   writing an index to the magnetic tape, wherein the index includes: metadata corresponding to the file stored on the magnetic tape, and metadata corresponding to a directory structure of the file;
   using a first key to encrypt a first portion of the metadata in the index corresponding to the file;
   using a second key to encrypt a first portion of the metadata in the index corresponding to the directory structure of the file;
   receiving an access request for data stored on the magnetic tape;
   receiving the first and second keys;
   using the received first and second keys to decrypt a portion of the encrypted metadata in the index of the magnetic tape; and in response to decrypting a portion of the encrypted metadata in the index of the magnetic tape, outputting a resulting file, wherein the resulting file is based on the portion of the metadata in the index of the magnetic tape decrypted by the received first and second keys, wherein a remainder of the encrypted metadata which was not decrypted by the received first and second keys is intentionally falsified and included in the resulting file output in decrypted form, wherein the index is written to the magnetic tape in response to receiving the write request from a particular entity, wherein the first and second keys are key encrypted keys which correspond to the particular entity, wherein data in the file itself is not encrypted, wherein the data in the file itself is stored on the magnetic tape in compressed form.

2. The tape drive-implemented method as recited in claim 1, wherein the index is written in Extensible Markup Language, wherein the metadata in the index corresponding to the file includes file tags, wherein the metadata in the index corresponding to the directory structure of the file includes directory tags.

3. The tape drive-implemented method as recited in claim 2, wherein using the first key to encrypt the first portion of the metadata in the index corresponding to the file includes using a cryptographic module in a tape drive to encrypt at least one of the file tags with the first key, wherein using the second key to encrypt the first portion of the metadata in the index corresponding to the directory structure of the file includes using the cryptographic module in the tape drive to encrypt at least one of the directory tags with the second key.

4. The tape drive-implemented method as recited in claim 1, wherein writing the index to the magnetic tape includes:
writing a first copy of the index to a data partition on the magnetic tape; and
writing a second copy of the index to an index partition on the magnetic tape,
wherein the first portion of the metadata in the index corresponding to the file and the first portion of the metadata in the index corresponding to the directory structure of the file are encrypted after the index has been written to the magnetic tape.

5. The tape drive-implemented method as recited in claim 1, wherein data is stored on the magnetic tape according to a linear tape file system format.

6. A computer program product for encrypting metadata on a magnetic tape, the computer program product comprising a computer readable storage medium having program instructions embodied therewith, wherein the computer readable storage medium is not a transitory signal per se, the program instructions readable and/or executable by a processor to cause the processor to perform a method comprising:

identifying, by the processor, a magnetic tape in a storage library having a plurality of magnetic tapes therein, wherein the identified magnetic tape has an adequate amount of free space thereon to perform a write request and has a lowest access time associated therewith in comparison to access times associated with a remainder of the magnetic tapes in the storage library;

determining, by the processor, whether the magnetic tape is currently loaded in a tape drive;

sending, by the processor, one or more instructions to load the magnetic tape into the tape drive in response to determining that the magnetic tape is not currently loaded in a tape drive;

writing, by the processor, an index to the magnetic tape, wherein the index includes:
metadata corresponding to a plurality of files stored on the magnetic tape, and
metadata corresponding to a directory structure of the plurality of files;

using, by the processor, a first key to encrypt a first portion of the metadata in the index corresponding to the plurality of files;

using, by the processor, a second key to encrypt a first portion of the metadata in the index corresponding to the directory structure of the plurality of files;

receiving, by the processor, an access request for data stored on the magnetic tape;

receiving, by the processor, the first and second keys;

using, by the processor, the received first and second keys to decrypt a portion of the encrypted metadata in the index of the magnetic tape; and in response to decrypting a portion of the encrypted metadata in the index of the magnetic tape, outputting, by the processor, a resulting file, wherein the resulting file is based on the portion of the metadata in the index of the magnetic tape decrypted by the received first and second keys, wherein a remainder of the encrypted metadata which was not decrypted by the received first and second keys is intentionally falsified and included in the resulting file output in decrypted form, wherein the index is written to the magnetic tape in response to receiving the write request from a particular entity, wherein the first and second keys are key encrypted keys which correspond to the particular entity, wherein data in the file itself is not encrypted, wherein the data in the file itself is stored on the magnetic tape in compressed form.

7. The computer program product as recited in claim 6, wherein the index is written in Extensible Markup Language, wherein the metadata in the index corresponding to the file includes file tags, wherein the metadata in the index corresponding to the directory structure of the file includes directory tags.

8. The computer program product as recited in claim 7, wherein using the first key to encrypt the first portion of the metadata in the index corresponding to the file includes using a cryptographic module in a tape drive to encrypt at least one of the file tags with the first key, wherein using the second key to encrypt the first portion of the metadata in the index corresponding to the directory structure of the file includes using the cryptographic module in the tape drive to encrypt at least one of the directory tags with the second key.

9. The computer program product as recited in claim 6, the program instructions readable and/or executable by the processor to cause the processor to perform the method comprising:

locating, by the processor, the magnetic tape on which the data corresponding to the access request is stored;

issuing, by the processor, a request for the magnetic tape on which the data corresponding to the access request is stored;

receiving, by the processor, the magnetic tape on which the data corresponding to the access request is stored; and loading, by the processor, the magnetic tape on which the data corresponding to the access request is stored into a tape drive.

10. The computer program product as recited in claim 6, the program instructions readable and/or executable by the processor to cause the processor to perform the method comprising:
using, by the processor, a third key to encrypt a second portion of the metadata in the index corresponding to the plurality of files; and
using, by the processor, a fourth key to encrypt a second portion of the metadata in the index corresponding to the directory structure of the plurality of files,
wherein the first and second keys are key encrypted keys that are assigned to a first entity,
wherein the third and fourth keys are key encrypted keys that are assigned to a second entity.

11. The computer program product as recited in claim 6, wherein data is stored on the magnetic tape according to a linear tape file system format,
wherein writing the index to the magnetic tape includes:
writing a first copy of the index to a data partition on the magnetic tape; and
writing a second copy of the index to an index partition on the magnetic tape.

12. A computer-implemented method, comprising:
receiving an access request for data stored on a magnetic tape, wherein the magnetic tape includes an index having metadata corresponding to files stored on the magnetic tape and metadata corresponding to a directory structure of the files, wherein at least some of the metadata corresponding to the files stored on the magnetic tape is encrypted with a first key, wherein at least some of the metadata corresponding to the directory structure of the files is encrypted with a second key;
receiving first and second keys which correspond to a particular entity;
using the received first key to decrypt a portion of the encrypted metadata in the index of the magnetic tape corresponding to the file;
using the received second key to decrypt a portion of the encrypted metadata in the index of the magnetic tape corresponding to the directory structure of the file;
outputting a resulting file to a read buffer; and
sending one or more instructions to compile data in the resulting file and/or directory information,
wherein the resulting file is based on the portion of the metadata in the index of the magnetic tape decrypted by the received key first and second keys,
wherein a remainder of the encrypted metadata which was not decrypted by the received first and second keys is intentionally falsified and included in the resulting file output to the read buffer in decrypted form,
wherein data in the file itself is not encrypted,
wherein the data in the file itself is stored on the magnetic tape in compressed form,
wherein the index is written to the magnetic tape in response to receiving a write request from a particular entity,
wherein the first and second keys are key encrypted keys which correspond to the particular entity,
wherein writing the index to the magnetic tape includes:
identifying a magnetic tape in a storage library having a plurality of magnetic tapes therein, wherein the identified magnetic tape has an adequate amount of free space thereon to perform the write request and has a lowest access time associated therewith in comparison to access times associated with a remainder of the magnetic tapes in the storage library,
determining whether the magnetic tape is currently loaded in a tape drive, and
sending one or more instructions to load the magnetic tape into the tape drive in response to determining that the magnetic tape is not currently loaded in a tape drive,
wherein the index is written to the magnetic tape.

13. The computer-implemented method as recited in claim 12, wherein the portion of the encrypted metadata in the index decrypted by the received first and second keys corresponds to a level of access permitted to the particular entity, wherein using the received first and second keys to decrypt the portion of the encrypted metadata in the index of the magnetic tape includes using a cryptographic module in a tape drive to decrypt the portion of the encrypted metadata.

14. The computer-implemented method as recited in claim 12, wherein the portion of the encrypted metadata in the index decrypted by the received first and second keys corresponds to a level of access permitted to the particular entity.

15. The computer-implemented method as recited in claim 12, wherein the index is written in Extensible Markup Language, wherein the metadata in the index corresponding to the files includes file tags, wherein the metadata in the index corresponding to the directory structure of the files includes directory tags, wherein at least one of the file tags is encrypted with the first key, wherein at least one of the directory tags is encrypted with the second key.

16. The computer-implemented method as recited in claim 12, wherein data is stored on the magnetic tape according to a linear tape file system format.

* * * * *